(12) United States Patent
Tobiason et al.

(10) Patent No.: US 11,119,214 B2
(45) Date of Patent: Sep. 14, 2021

(54) TRIANGULATION SENSING SYSTEM AND METHOD WITH TRIANGULATION LIGHT EXTENDED FOCUS RANGE USING VARIABLE FOCUS LENS

(71) Applicant: Mitutoyo Corporation, Kanagawa-ken (JP)

(72) Inventors: Joseph Daniel Tobiason, Bothell, WA (US); Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 215 days.

(21) Appl. No.: 16/563,362

(22) Filed: Sep. 6, 2019

(65) Prior Publication Data

US 2021/0072387 A1     Mar. 11, 2021

(51) Int. Cl.
| | |
|---|---|
| *G01S 17/48* | (2006.01) |
| *G02B 3/00* | (2006.01) |
| *G02B 3/14* | (2006.01) |
| *H04N 5/232* | (2006.01) |

(52) U.S. Cl.
CPC ............ *G01S 17/48* (2013.01); *G02B 3/0087* (2013.01); *H04N 5/232121* (2018.08); *G02B 3/14* (2013.01)

(58) Field of Classification Search
CPC ...... G01S 17/48; G02B 3/14; H04N 5/232121
See application file for complete search history.

(56) References Cited

U.S. PATENT DOCUMENTS

| | | | |
|---|---|---|---|
| 5,061,062 A | * | 10/1991 | Schneiter ............... G01B 11/24 356/3.05 |
| 7,627,162 B2 | | 12/2009 | Blanford et al. |
| 8,194,307 B2 | | 6/2012 | Arnold et al. |
| 8,957,960 B2 | | 2/2015 | Saylor et al. |

(Continued)

OTHER PUBLICATIONS

Djajadiningrat, "Extended Depth of Field Optical Projection Tomography," MSc Thesis, Delft University of Technology, Nov. 12, 2018, 85 pages.

(Continued)

*Primary Examiner* — Kara E. Geisel
*Assistant Examiner* — Jarreas C Underwood
(74) *Attorney, Agent, or Firm* — Seed IP Law Group LLP

(57) ABSTRACT

A triangulation sensing system includes a projection axis configuration and an imaging axis configuration. The projection axis configuration includes a triangulation light source (e.g. an incoherent source) and a variable focus lens (VFL) that is controlled to rapidly periodically modulate a triangulation light focus position (TLFP) along a Z axis over a focus position scan range, to provide a corresponding triangulation light extended focus range (TLEFR) that supports accurate measurement throughout. In some implementations, the triangulation system may be configured to provide the best measurement accuracy for a workpiece region of interest (WROI) by exposing its triangulation image only when the scanned TLFP temporarily coincides with the WROI Z height. In some implementations, the triangulation system may be configured to limit various measurement operations to using only an operational pixel subset of a detector that receives image light from the WROI, in order to shorten the measurement time.

19 Claims, 9 Drawing Sheets

XZ view of projection axis config.     YZ view of projection and imaging axis config.

(56) References Cited

U.S. PATENT DOCUMENTS

| | | | |
|---|---|---|---|
| 9,013,574 B2 | 4/2015 | Saylor et al. | |
| 9,143,674 B2 | 9/2015 | Gladnick | |
| 9,213,175 B2 | 12/2015 | Arnold | |
| 9,256,009 B2 | 2/2016 | Theriault et al. | |
| 9,646,425 B2 | 5/2017 | Yu et al. | |
| 9,726,876 B2 * | 8/2017 | Bryll | G02B 27/0075 |
| 9,736,355 B1 | 8/2017 | Bryll | |
| 9,740,190 B2 | 8/2017 | Bryll | |
| 9,774,765 B2 * | 9/2017 | Bryll | G06T 7/0004 |
| 9,830,694 B2 | 11/2017 | Bryll | |
| 9,930,243 B2 | 3/2018 | Gladnick et al. | |
| 9,952,586 B2 | 4/2018 | Yu et al. | |
| 9,983,459 B2 | 5/2018 | Arnold | |
| 10,101,572 B2 | 10/2018 | Bryll et al. | |
| 10,151,962 B2 | 12/2018 | Gladnick et al. | |
| 10,178,321 B2 | 1/2019 | Emtman et al. | |
| 10,520,650 B2 | 12/2019 | Freerksen et al. | |
| 10,809,378 B1 * | 10/2020 | Gladnick | H04N 5/232 |
| 2006/0211802 A1 | 9/2006 | Asgari | |
| 2008/0100829 A1 * | 5/2008 | Watson | G01B 11/0608 356/123 |
| 2008/0100850 A1 * | 5/2008 | Watson | G01B 11/0608 356/601 |
| 2010/0137990 A1 | 6/2010 | Apatsidis et al. | |
| 2012/0200832 A1 * | 8/2012 | Imai | G02B 27/104 353/20 |
| 2014/0368726 A1 * | 12/2014 | Gladnick | G01B 11/24 348/349 |
| 2016/0025903 A1 | 1/2016 | Arnold | |
| 2017/0052425 A1 | 2/2017 | Arnold | |
| 2017/0078549 A1 | 3/2017 | Emtman et al. | |
| 2018/0143419 A1 | 5/2018 | Bryll et al. | |
| 2018/0180773 A1 | 6/2018 | Usami et al. | |

OTHER PUBLICATIONS

Dorsch, et al., "Laser triangulation: fundamental uncertainty in distance measurement," *Applied Optics* 33(7): 1306-1314, 1994.

Freerksen et al., "External Reservoir Configuration for Tunable Acoustic Gradient Lens," U.S. Appl. No. 16/000,319, filed Jun. 5, 2018, 45 pages.

LMI Technologies, Inc., "User Manual," Document revision: D, Gocator 2300 & 2880 Series, 2015, 367 pages.

Mermillod-Blondin et al., "High-speed varifocal imaging with a tunable acoustic gradient index of refraction lens," Department of Mechanical and Aerospace Engineering, Princeton University, Optics Letters, vol. 33(18), Princeton, New Jersey, Sep. 15, 2008, 3 pages.

Young et al., "Depth-of-Focus in Microscopy," SCIA '93, Proc. of the 8*th* Scandinavian Conference on Image Analysis, Tromso, Norway, 1993, pp. 493-498. (6 pages).

* cited by examiner

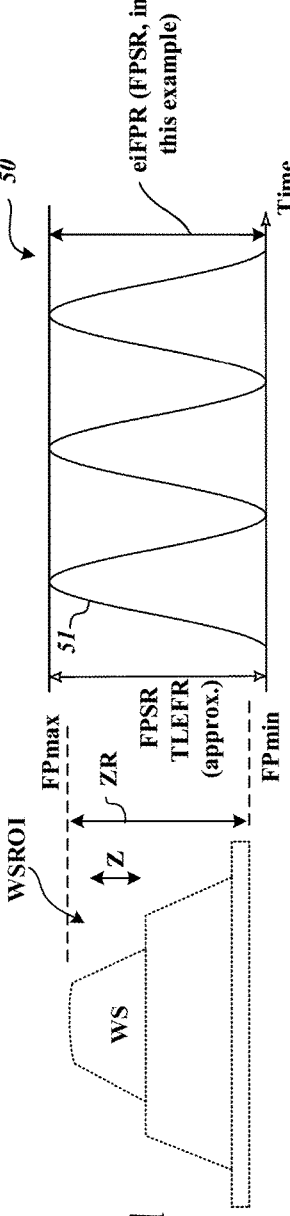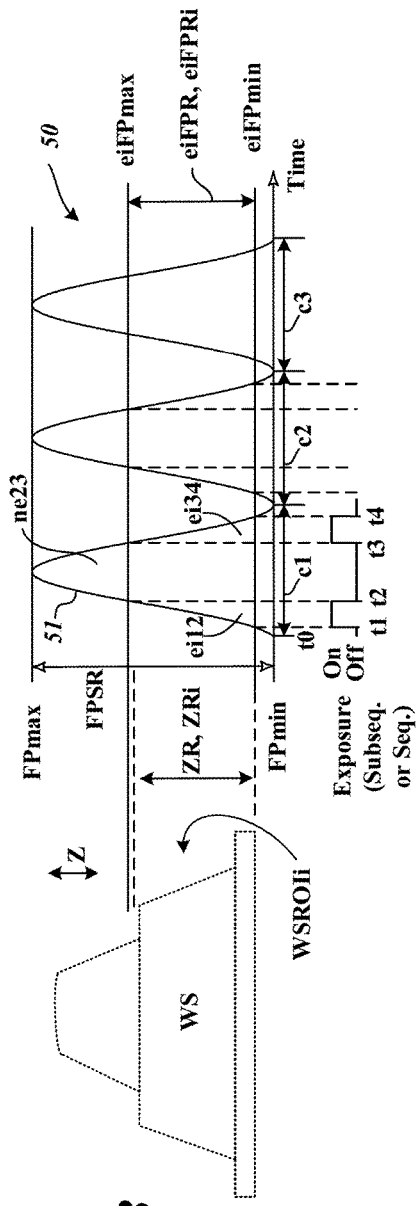

TRIANGULATION SENSING SYSTEM AND METHOD WITH TRIANGULATION LIGHT EXTENDED FOCUS RANGE USING VARIABLE FOCUS LENS

FIELD

The invention relates generally to non-contact measurements, and more particularly to triangulation sensors with a triangulation light extended focus range using a variable focus lens such as a tunable acoustic gradient (TAG) lens.

BACKGROUND

In a triangulation sensor, a ray of illumination light is directed to a target surface along a "projection axis," which is not coaxial with and thus forms an angle with an "imaging axis" of a sensing device. The intersection of the ray of light and the target surface produces a spot of light which is imaged on an imaging plane of the sensing device. The 3D position of this spot can be calculated from the known position and orientation of the illumination axis, the detection axis, and various components of the sensing device using trigonometric relations. This measurement technique is called triangulation. A conventional triangulation sensor is described, for example, in U.S. Pat. No. 5,061,062.

One desirable feature for a triangulation sensor is an extended depth of field. A depth of field is a range between the nearest target surface and the furthest target surface, relative to the sensing device, which provides an image that is sufficiently in focus to be usable by the sensing device. If the imaged spot of light is sufficiently in focus for only a narrow (shallow) depth of field, measurements of target surfaces outside this narrow depth of field become difficult, limiting the utility of a triangulation sensor in practical applications. A need exists for a triangulation sensor and method capable of producing imaged spots of light based on target surfaces that are located, relative to the sensing device, along an extended depth of field.

SUMMARY

A triangulation sensing system is disclosed that includes a variable focus lens (VFL) that provides a periodically modulated focus variation of a focus position FP of its triangulation light. In various implementations the VFL is controlled to rapidly periodically modulate the focus position FP along a Z axis over a focus position scan range FPSR to provide a corresponding triangulation light extended focus range (TLEFR) that supports accurate measurement throughout. Two methods are disclosed for use in conjunction with the triangulations sensing system. The methods are directed to best utilizing respective aspects of the triangulation sensing system. For purposes of convenient reference, without implying any limitation that is not explicitly stated and claimed herein, the first method summarized below may be referred to as an exposure sequence determining method. This method may be thought of as being directed toward selecting or using different prescribed types of exposure sequences, to obtain differently optimized triangulation image accuracy for workpiece regions that extend over different types of Z height ranges (e.g. large Z height ranges, small Z height ranges, a combination thereof, etc.) For purposes of convenient reference, without implying any limitation that is not explicitly stated and claimed herein, the second method summarized below may be referred to as an operational pixel subset method. This method may be thought of as being directed toward defining and using an operational pixel subset (that is, a subset of the pixels included in an image detector) that is customized to limit the scope and increase the speed of various triangulation image acquisition and measurement operations, in relation to a particular workpiece surface region of interest that is to be measured. In various implementations, the two methods may be used separately, or in combination.

Regarding the exposure sequence determining method, the method includes generally three steps.

First, a workpiece is placed in a measurement volume of the triangulation sensing system.

Second, the VFL is operated to periodically modulate the triangulation light focus position (FP) of a projection axis configuration of the triangulation sensing system. The triangulation light may be configured as a spot of light or a line of light at the focus position. The triangulation light focus position is periodically modulated over a focus position scan range (FPSR) along a projection axis direction or Z direction, to provide a triangulation light extended focus range (TLEFR) corresponding to the FPSR, wherein the TLEFR is greater than M times a nominal unmodulated focus range (NUFR) of the projection axis configuration along the Z axis, where M is an integer that is at least 2 (e.g. M may be 25, 50, or 100 or more in various implementations.)

Third, a triangulation image of the workpiece surface is exposed using a triangulation image exposure sequence. During the exposure sequence, the periodic modulation of the triangulation light focus position causes the triangulation light focus position to temporarily coincide with a Z height of at least one workpiece surface region of interest (WSROI) to be measured in the triangulation image. The exposure sequence may comprise at least one of exposure types c1) or c2) or c3).

Exposure type c1) comprises exposing the triangulation image using at least a first TYPE 1 exposure subsequence that is used during at least one cycle of the periodically modulated triangulation light focus position. The TYPE 1 exposure subsequence comprises at least one sustained exposure increment that is sustained or continuous over a range of respective triangulation light focus positions (an exposure increment focus position range eiFPR) that exceeds at least one of 5 NUFR or 10% of the TLEFR. In some implementations, the at least one sustained exposure increment is sustained or continuous over a range of respective triangulation light focus positions that exceeds at least one of 30 NUFR or 25% of the TLEFR, or more. For example, in one implementation the sustained exposure increment is a continuous exposure achieved by continuous operation of an illumination source, such as an incoherent illumination source, throughout the entire TLEFR during a triangulation image exposure.

Exposure type c2) comprises exposing the triangulation image using at least a first TYPE 2 exposure subsequence that is used during at least one cycle of the periodically modulated triangulation light focus position. The TYPE 2 exposure subsequence comprises a set of at least one discrete exposure increment, wherein each discrete exposure increment in that set has a duration corresponding to an exposure increment focus position range eiFPR that is less than at least one of 5 NUFR or 10% of the TLEFR, and is timed to correspond to the same nominal triangulation light focus position or focus position range.

Exposure type c3) comprises exposing the triangulation image using at least a first TYPE 3 exposure subsequence that is used during at least one cycle of the periodically modulated triangulation light focus position. The TYPE 3 exposure subsequence comprises a set of at least one discrete exposure increment, wherein each discrete exposure increment in that set has a duration corresponding to an exposure increment focus position range eiFPR that is less than at least one of 5 NUFR or 10% of the TLEFR, and is timed to correspond to the same nominal triangulation light focus position or focus position range, and is further timed to correspond to a predetermined nominal Z height or Z height range ZR of a workpiece surface region of interest to be measured in the triangulation image.

In some implementations wherein the triangulation image exposure sequence comprises exposure type c2) or c3), each discrete exposure increment in the set of at least one discrete exposure increment may have a duration corresponding to a respective exposure increment triangulation light focus position range eiFPR that is less than at least one of 3 NUFR or 5% of the TLEFR, or 2% of the TLER. In the TYPE 2 and TYPE 3 exposure subsequences, each member of the set of at least one discrete exposure increment generally corresponds to a discrete phase (or phase interval) of the periodically modulated triangulation light focus position corresponding to the same predetermined nominal Z height (or Z height range).

In various implementations, the discrete exposure increments may be determined by at least one of: a respective instance of an illumination source strobe operation that has a respective controlled timing defined in the triangulation image exposure sequence, or a respective instance of a camera shutter operation that has a respective controlled timing defined in the triangulation image exposure sequence. In some implementations, the respective controlled timings may be defined as a predetermined sequence in the triangulation image exposure sequence. A triangulation image may be exposed based on a single start signal that initiates an entire predetermined sequence defined in the triangulation image exposure sequence.

The exposure sequence determining method may also include a fourth step, in which the triangulation image is processed, to determine or output at least one respective Z height corresponding to at least one respective location on the workpiece surface that is included in the triangulation image exposed in the third step described above. For example, a coordinate map comprising a set of respective Z heights corresponding to respective locations on the workpiece surface that are included in the triangulation image may be determined or outputted, for display for example.

One implementation of a triangulation sensing system that may be used in conjunction with the exposure sequence determining method is outlined below. In some implementations, the triangulation sensing system outlined below may be configured to incorporate any or all compatible features of the exposure sequence determining method outlined above. However, it is not so limited and may also be used in other configurations. The triangulation sensing system includes a projection axis configuration having a projection optical axis which intersects with a measurement volume; an imaging axis configuration having an imaging optical axis which intersects with the measurement volume, wherein the imaging optical axis and the projection optical axis form a triangulation angle; and a processor configured to control operation of the projection axis configuration and the imaging axis configuration.

The projection axis configuration includes a light source; a variable focus lens (VFL) that provides a periodically modulated focus variation; and triangulation light shaping optics (TLSO) configured to shape light generated from the light source and modulated by the VFL to be output along the projection optical axis or a Z axis toward the measurement volume.

The imaging axis configuration includes a triangulation image detector; and imaging optics configured to transmit triangulation light from a surface of a workpiece located in the measuring volume to the triangulation image detector.

The processor is configured to control the VFL to periodically modulate a focus position of the triangulation light over a focus position scan range (FPSR) along a projection axis direction, to provide a triangulation light extended focus range (TLEFR) corresponding to the FPSR, wherein the TLEFR is greater than M times a nominal unmodulated focus range (NUFR) of the projection axis configuration along the Z axis, where M is an integer that is at least 2 (e.g. M may be 25, 50, or 100 or more in various implementations). In various implementations, the TLEFR may span a Z dimension of the measuring volume. The processor is further configured to expose a triangulation image of the workpiece surface using a triangulation image exposure sequence, wherein during the exposure sequence the periodic modulation of the triangulation light focus position causes the triangulation light focus position FP to temporarily coincide with a Z height of at least one workpiece surface region of interest WSROI to be measured in the triangulation image.

In various implementations, the VFL is advantageously a tunable acoustic gradient (TAG) lens. The periodic modulation may comprise a modulation frequency that is greater than 30 kHz, or greater than 70 kHz, or greater than 100 kHz, or greater than 400 kHz. In various implementations, the TLEFR may be greater than 10 mm, or greater than 20 mm, or greater than 30 mm, or greater than 40 mm.

In various implementations, the light source may comprise an incoherent light source, the triangulation light comprises incoherent light, and the projection axis configuration is configured to provide the triangulation light as a compact spot of light or a narrow line of light at the focus position. In some such embodiments, M may be at least 25, 50, or 100 or more.

In some implementations, where the projection axis configuration is configured to provide the triangulation light as the narrow line of light at the focus position (the line of light extending along an X axis direction), the projection axis configuration may comprise a source slit aperture having an axis aligned along the X axis direction and provided between the light source and the VFL in the projection axis configuration. In some such embodiments, the light source may comprise a plurality of light emitters arrayed to correspond to the shape of the source slit aperture, and the projection axis configuration may further comprise a linear or uniaxial diffuser between the VFL and the measurement volume, which nominally only diffuses along the line of light parallel to the X axis direction.

In some implementations, the triangulation image detector may comprise a 2D digital imaging device comprising pixels arranged in a plurality of columns that respectively extend along a measuring axis direction (Z') of the 2D digital imaging device, wherein the plurality of columns are adjacent to one another along a direction corresponding to the X direction. The processor of the triangulation sensing system may be further configured to process the triangulation image, to determine or output at least one respective Z height corresponding to at least one respective location on the workpiece surface that is included in the triangulation image. In some implementations the processor is configured to process the triangulation image, to determine or output a coordinate map comprising a set of respective Z heights corresponding to respective X locations on the workpiece surface that are included in the triangulation image.

In some implementations, the processor is further configured to expose a triangulation image of the workpiece surface using a triangulation image exposure sequence, wherein the triangulation image exposure sequence comprises at least one of exposure types b1) or b2) or b3), wherein: exposure type b1) comprises exposing the triangulation image using at least a first TYPE 1 exposure subsequence that is used during at least one cycle of the periodically modulated triangulation light focus position, the TYPE 1 exposure subsequence comprising at least one sustained exposure increment that is sustained or continuous over a range of respective triangulation light focus positions (an exposure increment focus position range eiFPR) that exceeds at least one of 5 NUFR or 10% of the TLEFR; exposure type b2) comprises exposing the triangulation image using at least a first TYPE 2 exposure subsequence that is used during at least one cycle of the periodically modulated triangulation light focus position, the TYPE 2 exposure subsequence comprising a set of at least one discrete exposure increment, wherein each discrete exposure increment in that set has a duration corresponding to an exposure increment focus position range eiFPR that is less than at least one of 5 NUFR or 10% of the TLEFR, and is timed to correspond to the same nominal triangulation light focus position or focus position range; and exposure type b3) comprises exposing the triangulation image using at least a first TYPE 3 exposure subsequence that is used during at least one cycle of the periodically modulated triangulation light focus position, the TYPE 3 exposure comprising a set of at least one discrete exposure increment, wherein each discrete exposure increment in that set has a duration corresponding to an exposure increment focus position range eiFPR that is less than at least one of 5 NUFR or 10% of the TLEFR, and is timed to correspond to the same nominal triangulation light focus position or focus position range, and is further timed to correspond to a predetermined nominal Z height or Z height range of a workpiece surface region of interest to be measured in the triangulation image.

Regarding the operational pixel subset method, it is a method for operating a triangulation sensing system including a variable focus lens (VFL) that provides a periodically modulated focus variation of a focus position of its triangulation light. In particular, the triangulation sensing system comprises: a projection axis configuration having a projection optical axis which intersects with a measurement volume; an imaging axis configuration having an imaging optical axis which intersects with the measurement volume—wherein the imaging optical axis and the projection optical axis form a triangulation angle; and a processor configured to control operation of the projection axis configuration and the imaging axis configuration. The projection axis configuration includes: a light source; triangulation light shaping optics configured to shape light generated from the light source into a narrow line of triangulation light at a focus position along a projection optical axis or a Z axis in the measurement volume, the line of triangulation light extending along a direction defining an X axis in the measurement volume; and a variable focus lens (VFL) configured to periodically modulate a focus position FP of the triangulation light over a focus position scan range (FPSR) along a projection axis direction, to provide a triangulation light extended focus range (TLEFR) corresponding to the FPSR, wherein the TLEFR is greater than M times a nominal unmodulated focus range (NUFR) of the projection axis configuration along the Z axis, where M is an integer that is at least 2. The imaging axis configuration includes: a triangulation image detector comprising a two-dimensional array of detector pixels that extends along a Z' axis of the detector that maps to the Z axis in the measurement volume, and along an X' axis of the detector that maps to the X axis in the measurement volume; and imaging optics configured to transmit triangulation light from a workpiece surface located in the measuring volume to the triangulation image detector. The processor is configured to:
 (a) control the VFL to periodically modulate the focus position FP of the triangulation light over the focus position scan range (FPSR) to provide the triangulation light extended focus range (TLEFR); and
 (b) expose a triangulation image of the workpiece surface using a triangulation image exposure sequence, wherein during the exposure sequence the periodic modulation of the triangulation light focus position FP causes the triangulation light focus position FP to temporarily coincide with a Z height of at least one workpiece surface region of interest to be measured in the triangulation image.

In particular, the operational pixel subset method that is used for operating the triangulation sensing system described above comprises:
 (M1) determining a respective workpiece surface region of interest WSROIi to be measured in a respective triangulation image using a respective triangulation image exposure sequence ESi, and determining a respective Z range ZRi that includes the respective WSROIi to be measured;
 (M2) determining the respective triangulation image exposure sequence ESi, including determining a respective exposure increment focus position range eiFPRi that is used during at least one exposure increment in the respective exposure sequence ESi, wherein the respective exposure increment focus position range eiFPRi includes the respective Z range ZRi, and is timed to include a time when the triangulation light focus position FP coincides with the Z range ZRi;
 (M3) determining a respective operational pixel subset OPSi of the detector pixels that is to be used for determining the measurement of the respective workpiece surface region of interest WSROIi based on the respective triangulation image, wherein:
  the operational pixel subset OPSi includes at least pixels in a Z' range Z'ROPSi on the detector that includes at least one of the respective exposure increment focus position range eiFPRi or the respective Z range ZRi as mapped onto the detector, and
  the operational pixel subset OPSi excludes at least pixels that correspond to Z positions that are farther than as least one of 5 NUFR or 10% of TLEFR from the respective exposure increment focus position range eiFPRi, as mapped onto the detector; and
 (M4) performing operations to measure the respective workpiece surface region of interest WSROIi in the respective triangulation image, comprising:
  (M4a) acquiring the respective triangulation image using the respective exposure sequence ESi with a workpiece surface including the respective workpiece surface region of interest WSROIi located in the measurement volume MV;
  (M4b) reading out pixel data of the acquired respective triangulation image from the detector to a triangulation image analyzing circuit or routine; and (M4c) operating the triangulation image analyzing circuit or routine to measure the respective workpiece surface region of interest WSROIi in the respective triangulation image based on the pixel data, wherein, in at least one of the operations (M4a), (M4b) or (M4c), that operation is limited to pixels or pixel data corresponding to the operational pixel subset OPSi.

In some implementations in the step (M4) the operation (c) is limited to pixels or pixel data corresponding to the operational pixel subset OPSi. In other implementations the operations (b) and (c) are limited to pixels or pixel data corresponding to the operational pixel subset OPSi. In other implementations all the operations (a), (b) and (c) are limited to pixels or pixel data corresponding to the operational pixel subset OPSi.

In some implementations, in the step (M1), determining the respective workpiece surface region of interest WSROIi comprises at least one of: (i) operating a workpiece inspection program generator that is connected to or part of the triangulation sensing system to automatically define the workpiece surface region of interest WSROIi based on a CAD model of the workpiece surface; or (ii) a user selecting or defining the workpiece surface region of interest WSROIi in a user interface that is connected to or part of the triangulation sensing system. In some such implementations, the step (M1) further comprises displaying the determined respective workpiece surface region of interest WSROIi in the context of the workpiece surface in a graphical user interface that is connected to or part of the triangulation sensing system.

In some implementations, in the step (M2), determining the respective exposure increment focus position range eiFPRi comprises at least one of: (i) operating an ESi generating routine or program that is connected to or part of the triangulation sensing system, to automatically define the respective exposure increment focus position range eiFPRi based on the respective Z range ZRi determined in the step (M1), in combination with data characterizing the periodic modulation of the focus position FP in the triangulation sensing system; or (ii) a user selecting or defining the respective exposure increment focus position range eiFPRi in a user interface that is connected to or part of the triangulation sensing system. In some such implementations, the step (M2) further comprises displaying a representation of the determined respective exposure increment focus position range eiFPRi in a graphical user interface that is connected to or part of the triangulation sensing system. In some such implementations, wherein the ESi generating routine or program is configured to automatically define the respective exposure increment focus position range eiFPRi to be less than a predetermined limit that is less than at least one of 5 NUFR or 10% of the TLEFR, if the workpiece surface region of interest WSROIi corresponds to a planar surface feature that is characterized by a single Z height in a CAD model of the workpiece surface.

In some implementations the step (M2) comprises: (i) determining the respective triangulation image exposure sequence ESi initially; (ii) generating a simulated or actual triangulation image of the respective workpiece surface region of interest WSROIi, using the initially determined image exposure sequence ESi; (iii) analyzing an image beam width corresponding to the respective workpiece surface region of interest WSROIi in the simulated or actual triangulation image, and determining if the measurement accuracy associated with that image beam width is acceptable or not acceptable; and (iv) if it is determined that the measurement accuracy associated with that image beam width is not acceptable, then performing operations to reduce the respective exposure increment focus position range eiFPRi that is used in the image exposure sequence ESi, to provide an improved respective triangulation image exposure sequence ESi.

In some implementations, in the step (M3), determining the respective operational pixel subset OPSi comprises at least one of: (i) operating an OPSi generating routine or program that is connected to or part of the triangulation sensing system, to automatically define the respective operational pixel subset OPSi based on at least one of the respective exposure increment focus position range eiFPRi that is determined in step (M2), or the respective Z range ZRi determined in the step (M1), in combination with data characterizing a mapping of measurement volume coordinates to image detector coordinates in the triangulation sensing system; or (ii) a user selecting or defining the respective operational pixel subset OPSi in a user interface that is connected to or part of the triangulation sensing system. In some such implementations, the step (M3) further comprises displaying a representation of the determined respective operational pixel subset OPSi in a graphical user interface that is connected to or part of the triangulation sensing system.

In some implementations, the operations of steps (M1), (M2) and (M3) are performed using the triangulation sensing system during a learn mode operations, wherein data determined during the learn mode operations is stored in a respective workpiece surface inspection program or routine, including data characterizing at least the respective workpiece surface region of interest WSROIi, the respective triangulation image exposure sequence ESi including the respective exposure increment focus position range eiFPRi, and the respective operational pixel subset OPSi, along with other parameters of the triangulation sensing system that are necessary for exposing a triangulation image of the respective workpiece surface region of interest WSROIi using the triangulation image exposure sequence ESi. The operations of step (M4) are performed at a time after the learn mode operations, by using the triangulation sensing system to execute that respective workpiece surface inspection program or routine.

One implementation of a triangulation sensing system that may be used in conjunction with the operational pixel subset method is outlined below. In various implementations, the triangulation sensing system outlined below may be configured to incorporate or implement some or all compatible features of the operational pixel subset method outlined above. The triangulation sensing system includes: a projection axis configuration having a projection optical axis which intersects with a measurement volume; an imaging axis configuration having an imaging optical axis which intersects with the measurement volume, wherein the imaging optical axis and the projection optical axis form a triangulation angle; and a processor configured to control operation of the projection axis configuration and the imaging axis configuration. The projection axis configuration includes: a light source; a triangulation light shaping optics configured to shape light generated from the light source into a narrow line of triangulation light at a focus position along a projection optical axis or a Z axis in the measurement volume, the line of triangulation light extending along a direction defining an X axis in the measurement volume; and the variable focus lens (VFL), configured to periodically modulate a focus position FP of the triangulation light over a focus position scan range (FPSR) along a projection axis direction, to provide a triangulation light extended focus range (TLEFR) corresponding to the FPSR, wherein the TLEFR is greater than M times a nominal unmodulated focus range (NUFR) of the projection axis configuration along the Z axis, where M is an integer that is at least 2. The imaging axis configuration includes: a triangulation image detector comprising a two-dimensional array of detector pixels that extends along a Z' axis of the detector that maps to the Z axis in the measurement volume, and along an X' axis of the detector that maps to the X axis in the measurement volume; and imaging optics configured to transmit triangulation light from a workpiece surface located in the measuring volume to the triangulation image detector. The processor is configured to: (a) control the VFL to periodically modulate the focus position FP of the triangulation light over the focus position scan range (FPSR) to provide the triangulation light extended focus range (TLEFR); and (b) expose a triangulation image of the workpiece surface using a triangulation image exposure sequence, wherein during the exposure sequence the periodic modulation of the triangulation light focus position FP causes the triangulation light focus position FP to temporarily coincide with a Z height of at least one workpiece surface region of interest to be measured in the triangulation image; and the processor is further configured to control the triangulation sensing system to perform at least the operations of the operational pixel subset method comprising:

(M1) determining a respective workpiece surface region of interest WSROIi to be measured in a respective triangulation image using a respective triangulation image exposure sequence ESi, and determining a respective Z range ZRi that includes the respective WSROIi to be measured;

(M2) determining the respective triangulation image exposure sequence ESi, including determining a respective exposure increment focus position range eiFPRi that is used during at least one exposure increment in the respective exposure sequence ESi, wherein the respective exposure increment focus position range eiFPRi includes the respective Z range ZRi, and is timed to include a time when the triangulation light focus position FP coincides with the Z range ZRi;

(M3) determining a respective operational pixel subset OPSi of the detector pixels that is to be used for determining the measurement of the respective workpiece surface region of interest WSROIi based on the respective triangulation image, wherein:

the operational pixel subset OPSi includes at least pixels in a Z' range Z'ROPSi on the detector that includes at least one of the respective exposure increment focus position range eiFPRi or the respective Z range ZRi as mapped onto the detector, and the operational pixel subset OPSi excludes at least pixels that correspond to Z positions that are farther than as least one of 5 NUFR or 10% of TLEFR from the respective exposure increment focus position range eiFPRi, as mapped onto the detector; and (M4) performing operations to measure the respective workpiece surface region of interest WSROIi in the respective triangulation image, comprising:

(M4a) acquiring the respective triangulation image using the respective exposure sequence ESi with a workpiece surface including the respective workpiece surface region of interest WSROIi located in the measurement volume MV;

(M4b) reading out pixel data of the acquired respective triangulation image from the detector to a triangulation image analyzing circuit or routine; and (M4c) operating the triangulation image analyzing circuit or routine to measure the respective workpiece surface region of interest WSROIi in the respective triangulation image based on the pixel data, wherein, in at least one of the operations (M4a), (M4b) or (M4c), that operation is limited to pixels or pixel data corresponding to the operational pixel subset OPSi.

In some implementations the light source of the triangulation system is an incoherent light source that provides incoherent triangulation light, and the incoherent triangulation light focus position FP is periodically modulated over the focus position scan range (FPSR). In some such implementations M may be at least 25.

In some implementations, the TLEFR spans a Z dimension of the measurement volume. In some implementations the VFL is a tunable acoustic gradient (TAG) lens, and the periodic modulation comprises a modulation frequency that is greater than 30 kHz. In some implementations, the triangulation sensing system is configured such that each exposure increment included in the respective exposure sequence ESi is determined by at least one of: (i) driving the light source to provide a strobe pulse that has a respective controlled timing defined in the respective exposure sequence ESi, or (ii) controlling an electronic camera shutter operation that has a respective controlled timing defined in the respective exposure sequence ESi.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5 and 5A-5D illustrate respective triangulation image exposure timings of three (3) sample exposure types usable with a triangulation sensing system according to principles disclosed herein, including a sustained exposure type, a discrete (e.g., pulsed) exposure type, and Z-height specific discrete exposure type;

DETAILED DESCRIPTION

Figure 1:
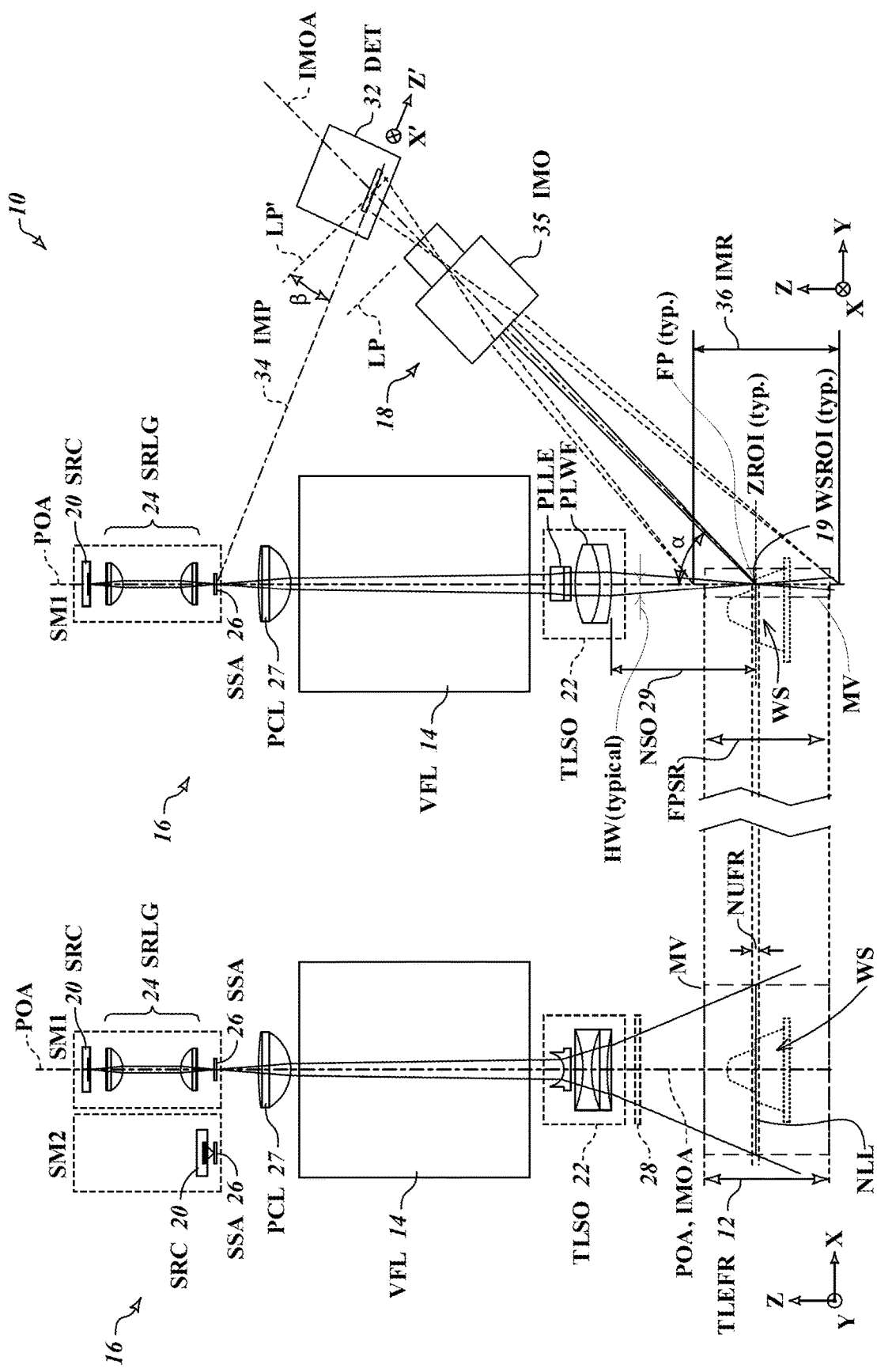
FIG. 1 is a schematic diagram of one embodiment of a triangulation sensing system and method with triangulation light extended focus range (TLEFR) using a variable focus lens (VFL) such as a tunable acoustic gradient (TAG) lens, shown in YZ view and in XZ view that are orthogonal to each other.

FIG. 1 is a schematic diagram showing a workpiece having a workpiece surface WS and one embodiment of a triangulation sensing system 10. The triangulation sensing system 10 includes a projection axis configuration 16 that provides triangulation light forming a line represented by nominal projected line length NLL in a triangulation light extended focus range TLEFR 12 (also referred to as extended focus range TLEFR, herein) provided by using a variable focus lens (VFL) 14, such as a tunable acoustic gradient (TAG) lens, as shown in FIG. 1 in orthogonal YZ (on the right) and XZ (on the left) views. Briefly, the triangulation light extended focus range TLEFR 12 is achieved by operating the VFL 14 to modulate a focus position FP of the triangulation light over a focus position scan range (FPSR) along a projection axis or Z axis direction. The TLFER corresponds to the focus position scan range FPSR, and is at least M times a nominal unmodulated focus range NUFR of triangulation light which is exhibited when the VFL 14 is in a fixed focus state or turned off, as explained in greater detail below with reference to FIGS. 4A and 4B. M may be at least 2. However, it is advantageous in various implementations if M is at least 10, 25, 50 or 100, or more.

According to one useful description, the nominal unmodulated focus range NUFR may be approximated by the depth of focus of the projection axis configuration 16 which is exhibited when the VFL 14 is in a fixed focus state or turned off. According to a more specific useful description that is introduced here and continued in greater detail below, the nominal unmodulated focus range NUFR may be defined in terms of the half width HW of the projected triangulation light across its narrow (Y) direction. It will be understood that it may be advantageous in various applications to define or set an upper limit for the beam width and/or half width HW that predominates (or is used exclusively) in an image exposure related to a particular workpiece surface region of interest WSROI having a corresponding Z height ZROI, in order to better define the location of the projected triangulation light line in that image exposure and thereby limit the system measurement uncertainty. It will be understood that the half width HW of the projected triangulation light along the Y direction is minimum at an instantaneous focus position FP having a corresponding Z height (that is, at the instantaneous beam waist) and widens out from there along the direction of the projection optical axis POA or Z axis direction, approximately as shown in FIG. 1. According to this description, the desired or acceptable limit for the half width HW along the Y direction thus defines the dimension of the desired or acceptable nominal unmodulated focus range NUFR along the Z direction.

As described in greater detail with reference to FIGS. 4A and 4B, it will be appreciated that because it is focused, the half width HW of the projected triangulation light diverges to exceed the desired limit for the half width HW outside of the nominal unmodulated focus range NUFR. However, due to the modulation of the location of the focus position FP over the focus position scan range FPSR and the extended focus range TLEFR 12 by the VFL 14, for any particular workpiece surface region of interest WSROI having a corresponding Z height ZROI anywhere within extended focus range TLEFR 12, its image may be predominantly or exclusively exposed when the focus position FP of the triangulation light temporarily has a Z height corresponding to the Z height ZROI. It will be understood that the triangulation light half width HW exposed in such an image corresponding to the workpiece surface region WSROI at the Z height ZROI, may be predominantly or exclusively within the desired limit for the half width HW, as described in greater detail below.

Continuing the description of FIG. 1, it depicts the illumination of a particular workpiece surface region of interest WSROI 19 in the measurement volume MV at a time when the focus point FP temporarily coincides with the Z height ZROI of the workpiece surface region of interest WSROI. With use of the VFL 14, the location of the focus point FP can move throughout the triangulation light extended focus range TLEFR 12, which may span the measurement volume MV in various embodiments. In some implementations, the TLEFR and/or the Z dimension of the measurement volume MV may be greater than 10 mm, 20 mm, 30 mm, 40 mm or more.

Referring to the YZ view on the right, the triangulation sensing system 10 includes a projection axis configuration 16 that extends along a projection optical axis POA and that intersects with the extended measurement volume MV, and an imaging axis configuration 18 that extends along an imaging optical axis IMOA and that is configured to image the extended measurement volume MV. The projection optical axis POA and the imaging optical axis IMOA form a triangulation angle $\alpha$ which can be used to calculate the 3D position of a light spot (or line segment) of the triangulation light reflected from workpiece surface regions located at various Z heights in the measurement volume MV.

The triangulation light, which has a narrowest beam width at focus position FP, is formed by the projection axis configuration 16 and imaged by the imaging axis configuration 18 throughout the measuring volume MV. To improve measurement resolution at any respective workpiece surface region of interest WSROI located at a respective Z height ZROI, a triangulation image may be acquired when the scanned focus position FP is temporarily located at that respective Z height ZROI, to produce a minimum half width HW of the triangulation light on that respective workpiece surface region of interest WSROI in that triangulation image, as explained in greater detail below.

In the illustrated implementation, projection axis configuration 16 includes a light source SRC 20, the VFL 14 that provides a periodically modulated focus variation (e.g., a TAG lens), and triangulation light shaping optics TLSO 22 configured to shape light generated from the light source SRC 20 and modulated by the VFL 14 to be output along the projection optical axis POA toward the measurement volume MV. The triangulation light shaping optics TLSO 22 may comprise a line length expander lens PLLE (e.g., LK1836L1-A lens available from Thorlabs, Inc. of Newton, N.J.) and a line width focusing lens PLWF (e.g., ACY254-050-A lens available from Thorlabs, Inc. of Newton, N.J.) as shown in the illustrated example. In the implementation illustrated in FIG. 1, the projection axis configuration 16 may further include a source relay lens group 24, a source slit aperture SSA 26, a projection collimating lens PCL 27, and a diffuser 28.

The light source SRC 20 may be any suitable light source such as a laser light source, a light emitting diode (LED) light source, optical comb light source, or the like. For example, in some implementations a blue or violet laser or LED may be used. In various embodiments, a strobe illumination light source may advantageously be used. However, in various exemplary embodiments, the principles disclosed herein are particularly advantageous when the light source is an incoherent light source (e.g., white light source or under-threshold laser diode). Despite the introduction of detrimental laser speckle, modern triangulation sensing systems have typically employed laser light sources, rather than white light sources, because in part laser light sources are able to maintain a narrow beam width over a substantial Z distance, in order to provide a relatively longer accurate measurement range. An incoherent light source has a technical advantage of reducing speckles to produce substantially speckle-free triangulation images, increasing the utility and resolution of a triangulation sensing system in various applications. That is, substantially speckle-free images improve the z measurement uncertainty (the fundamental (minimal) uncertainty limit to a measurement of z in the measurement volume MV that the triangulation sensing system 10 can make) at a given measurement signal strength. Previously to the present disclosure, an incoherent light (e.g. white light) triangulation sensing has not been known to economically achieve a relatively long and accurate measurement range comparable to that achievable with laser light sources, especially in conjunction with a reasonable measurement throughput rate. Although applicable to either laser light sources or incoherent light sources, it should be appreciated that the principle disclosed herein are particularly advantageous for solving these problems in conjunction with the use of an incoherent light source. Sample incoherent light sources that may be used as the light source SRC 20 include a high-power white laser (optical comb device) available from SLD Laser of Soraa Inc. of Santa Barbara, Calif., which has a further technical advantage of high spatial coherence that can improve lateral spot or line localization δy and z measurement uncertainty δz; and white LEDs available from Luminus Inc. of Sunnyvale, Calif.

Figure 2:
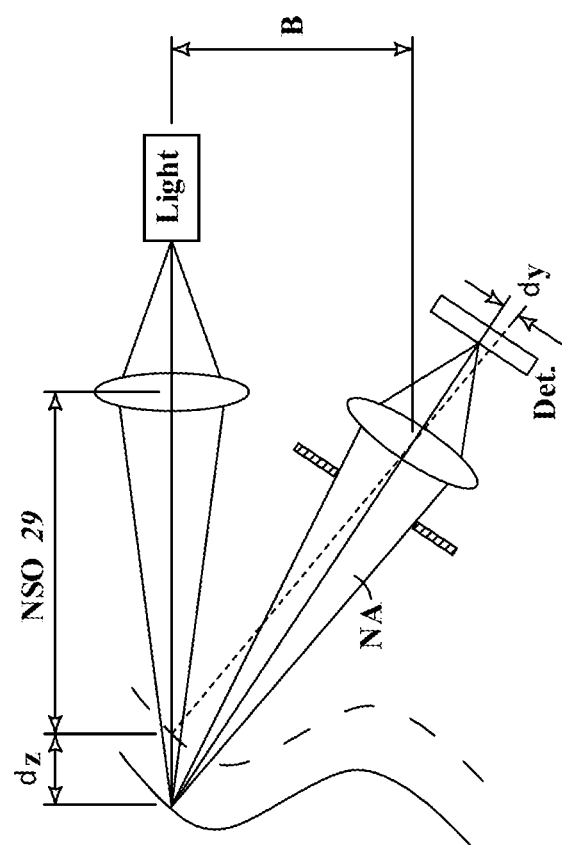
FIG. 2 is a schematic diagram illustrating the z measurement uncertainty ($\delta z$) and signal strength achievable with a triangulation sensing system according to principles disclosed herein.

In reference to FIG. 2, the fundamental z uncertainty δz (um) as limited by speckle can be estimated according to the following equations (based on Rainer G. Dorsch, Gerd Häusler, and Jürgen M. Herrmann. 1994. Laser triangulation—Fundamental Uncertainty in Distance Measurement. Applied Optics 33(7):1306-14.) and a table of parameters:

$$\delta z \sim \frac{1}{M \sin \alpha} \delta y$$

where spot localization on detector δy (see FIG. 2) and signal to noise ratio SNR are given by $$\delta y \sim \frac{1}{\pi} \frac{\bar{\lambda}}{NA} \frac{1}{SNR}$$

$$SNR \sim \frac{2\sqrt{N}}{\sqrt{N}\,C + 1}$$

The triangulation light must fully illuminate the corresponding detected spot localized on the object to achieve this measurement uncertainty. That is, $$\text{Minimum Half Width } MHW \gtrsim \frac{\delta y}{2M}$$

In addition, at least three detector pixels of spacing P are required to sample across the imaged beam width to enable interpolation or Gaussian fitting of the detected signal. This condition is more limiting for example design parameters in the table $$\text{Minimum Half Width } MHW \gtrsim \frac{3P}{2M}$$

The measurement uncertainty from interpolation or fitting (e.g., fitting the detected signal to a Gaussian profile) is approximated as $$\sigma_z \sim \frac{1}{\sin \alpha} \frac{1}{SNR} \sqrt{\frac{(HW)(P)}{M}}$$

Finally, the total uncertainty is approximated as a combination of fundamental uncertainty from speckle and measurement uncertainty $$\sigma_{tot} \sim \sqrt{\sigma_z^2 + (\delta z)^2}$$

| | Example Design Parameters | | Constraints |
|---|---|---|---|
| $\bar{\lambda}$ | Average optical wavelength | 0.4 μm | shorter wavelengths improve resolution |
| M | Magnification | 0.2 | |
| N | Signal strength | 200 | Eye safety, light source, workpiece, detector counts |
| C | Speckle contrast | 1→0.1 | Workpiece, light source |
| α | Triangulation angle, see FIG. 1 | 40° | Occlusion |
| NA | Numerical aperture imaged from object | 0.1 | Practical size |
| SNR | Signal to noise ratio | 1.9→12 | |
| δy | See FIG. 2 | 0.7→0.1 μm | |
| δz | Fundamental Z uncertainty | 5→0.8 μm | |
| MHW | Minimum half width | >9 μm | Pixel size |
| $\sigma_z$ | Measurement uncertainty | 10.3→1.7 μm | |
| $\sigma_{tot}$ | Total uncertainty | 11.6→1.9 μm | |

As can be seen from the equations and the table above, less speckle (C=1→0.1) and greater signal strength N means greater SNR, and greater SNR leads to improved z measurement uncertainty δz. In the limit of C→0, the spot localization on detector δy and measurement uncertainty δz can decrease from single digit microns to sub-micron. Good total uncertainty also requires a narrow enough triangulation light beam. For comparison, a half width HW of 50 um increases total uncertainty to $\sigma_{tot}$=25 um (C=1) or $\sigma_{tot}$=4 um (C=0.1). Design parameters such as M can be changed to achieve smaller uncertainties. Achieving a beam width with half width HW on the order of 10 to 50 microns is desirable to achieve measurement uncertainty $\sigma_z$ on the order of a few um (e.g., 1 um), and extending the Z range over which a desired half width HW can be achieved is beneficial to increase the measurement volume.

Referring back to FIG. 1, the source slit aperture SSA 26 may be provided between the light source 20 and the VFL 14, to limit the divergence angle(s) of a bundle of rays that are projected to the VFL 14, or to the projection collimating lens PCL 27 in the illustrated example. The source slit aperture SSA 26 may be provided in various alternative source module configurations such as source module configurations SM1 and SM2 shown in the view at the left in FIG. 1. The source module configuration SM1 includes the source relay lens group SRLG 24, which comprises a pair of opposing lenses in the illustrated embodiment, arranged between the light source SRC 20 and the source slit aperture SSA 26. The source relay lens group SRLP 24 is configured to provide a suitable imaging magnification (e.g., −0.243X) and to allow the light from the light source SRC 20 to be directed at the source slit aperture SSA 26 for increased optical throughput. The source module configuration SM2 includes the light source SRC 20 and the source slit aperture SSA 26, without the source relay lens group SRLG 24. Increased optical throughput may also be achieved by custom source footprint of the light source SRC 20 which matches the source slit aperture SSA 26, or by arraying a plurality of light sources to form the (elongated) light source SRC 20 that matches the (elongated) source slit aperture SSA 26. In various embodiments, an image of the X length of the source slit aperture SSA 26 is greater than 5 mm, or greater than 10 mm, or greater than 20 mm. Either of these alternative source module configurations SM1 and SM2, as well as any of their modifications, may be used depending on the design purposes and constraints of each application.

For example, when multiple light sources are arrayed to form a light source SSA 26 having an elongated footprint, the diffuser 28 may be included at a suitable position in the projection axis configuration 16, to minimize stray reflections within the projection axis configuration optics and to direct more divergent rays on the measurement volume MV while evening out the overall intensity profile. The diffuser 28 in such an example may be a linear or uniaxial diffuser which nominally diffuses in the X direction only (that is, along the direction nominally parallel to a long axis of the slit aperture and/or the projected line of triangulation light) and may be placed between the VFL 14 and the measurement volume MV.

In accordance with principles disclosed herein, in various implementations the VFL 14 is a tunable acoustic gradient (TAG) lens. The TAG lens 14 is a high-speed variable focus length lens that uses sound waves in a fluid medium to modulate a focus position, and can periodically sweep a range of focal lengths at a high frequency. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated by reference in its entirety. TAG lenses and related controllable signal generators are available, for example, from Mitutoyo Corporation of Kanagawa, Japan. TAG lenses are capable of periodic modulation having a modulation frequency that is greater than 30 kHz, or greater than 70 kHz, or greater than 100 kHz, or greater than 400 kHz. For example, SR38 series TAG lenses available from TAG Optics are capable of periodic modulation having a modulation frequency of up to 1.0 MHz. Various aspects of operating principles and applications of TAG lenses are described in greater detail in U.S. Pat. Nos. 9,930,243; 9,736,355; 9,726,876; 9,143,674; 8,194,307; and 7,627,162; and in US Patent Application Publication Nos. 2017/0078549 and 2018/0143419, each of which is hereby incorporated herein by reference in its entirety.

In operation, the focus position of the light from the light source SRC 20 is periodically modulated by the VFL (TAG lens) 14, and it is directed through the triangulation light shaping optics TLSO 22 and temporarily focused at all focus positions FP throughout the focus position scan range FPSR in the measurement volume MV during the periodic modulation. Triangulation light from the measurement volume MV is redirected along the imaging optical axis IMOA to the imaging axis configuration 18 of the triangulation sensing system 10. A nominal standoff NSO 29 may be defined between a light-projecting end of the projection axis configuration 16 (e.g. the triangulation light shaping optics 22) and a nominal mid-point of the range or measurement volume MV of the triangulation sensing system 10, approximately as illustrated example FIG. 1.

The imaging axis configuration 18 includes a triangulation image detector DET 32 having an image plane IMP 34 (which intersects with the optional source slit aperture SSA 26 in the illustrated example) and imaging optics IMO 35 having a lens plane LP. The imaging optics IMO 35 are configured to transmit triangulation light (e.g., reflected, diffracted, or scattered) from a workpiece surface WS located in the measuring volume MV to the triangulation image detector DET 32. The triangulation image detector DET 32 may comprise, for example, a 2D array of pixels or image sensors available from Photonfocus AG of Lachen, Switzerland. The pixels may be arranged in a plurality of columns that respectively extend along a measuring axis direction Z' of the 2D digital imaging device, wherein the plurality of columns are adjacent to one another along an X' direction corresponding to the X direction.

In various exemplary embodiments, the triangulation sensing system 10 is configured to satisfy the Scheimpflug principle well known in the art, with the Scheimpflug angle β defined between the image plane IMP 34 and the lens plane LP' (illustrated in FIG. 1 as parallel-translated from LP) set to ensure imaging of the triangulation light focus position FP located within the Scheimpflug imaging range IMR 36. In other words, the relative position and orientation of the periodically modulated focus position FP, the lens plane LP, and the image plane IMP 34 are set so that the periodically modulated focus position FP can be imaged throughout the Scheimpflug imaging range IMR 36. In accordance with various embodiments, use of the VFL 14 that provides a periodically modulated focus variation, such as a TAG lens, allows for achieving the triangulation light extended focus range TLEFR 12 which may closely match the Scheimpflug imaging range IMR 36. In other words, while the triangulation light extended focus range TLEFR 12 is illustrated to be smaller than the possible Scheimpflug imaging range IMR 36 in FIG. 1, it is possible to set the triangulation light extended focus range TLEFR 12 as large as the Scheimpflug imaging range IMR 36 in various implementations.

In the YZ view of the triangulation sensing system 10 shown on the right in FIG. 1, the triangulation light focus position FP corresponds to the smallest dimension of the footprint of the triangulation light along the Y axis at a particular time. In general, a triangulation image of a smaller beam width on a workpiece surface allows a higher-resolution determination of the Z height of that surface. In the XZ view of the triangulation sensing system 10 shown on the left in FIG. 1, the triangulation light focus position FP is formed along a nominal projected line length NLL (e.g., 20.0 mm) along the X axis. In general, a larger NLL means a larger measurement volume along the X axis and/or increased optical throughput for larger workpieces. Thus, the triangulation light focus position FP in the illustrated example of FIG. 1 corresponds to a line of light, though the triangulation light focus position FP may also correspond to a spot of light or other shapes of light depending on the design purposes of each application.

As previously outlined, the VFL lens 14 may be a TAG lens. A TAG lens 14 is electronically controllable to periodically modulate the triangulation light focus position FP over a focus position scan range FPSR along the projection optical axis direction in the triangulation light extended focus range TLEFR 12, during any cycle (period) of the driving modulation signal. In various embodiments, the TAG lens 14 may be driven using a periodic signal such that the triangulation light focus position FP is modulated sinusoidally over time. The triangulation sensing system 10 controls the TAG lens 14 to periodically modulate the triangulation light focus position FP without macroscopically adjusting the spacing between elements in the triangulation sensing system 10. For example, the distance between the triangulation light shaping optics TLSO 22 and the measurement volume MV need not be adjusted in order to periodically modulate the triangulation light focus position FP.

In one exemplary configuration, various parameters of the triangulation sensing system 10 may be set as follows:

Example Angles and lengths

| | Name | Example |
|---|---|---|
| α | Triangulation angle | 40° |
| β | Scheimpflug angle | 15.5° |
| NSO (W) | Nominal standoff | 43.9 mm |
| NUFR | Nominal unmodulated focus range | 0.21 mm |
| TLEFR | Triangulation light extended focus range | 32.9 mm |
| IMR | Scheimpflug imaging range | 45.8 mm |
| NLL | Nominal projected line length | 20.0 mm |

Projection optics for a laser-based design with similar standoff and triangulation angles could achieve ~18 mm of NUFR, albeit with undesirable single-wavelength and speckle limitations.

Figure 3:
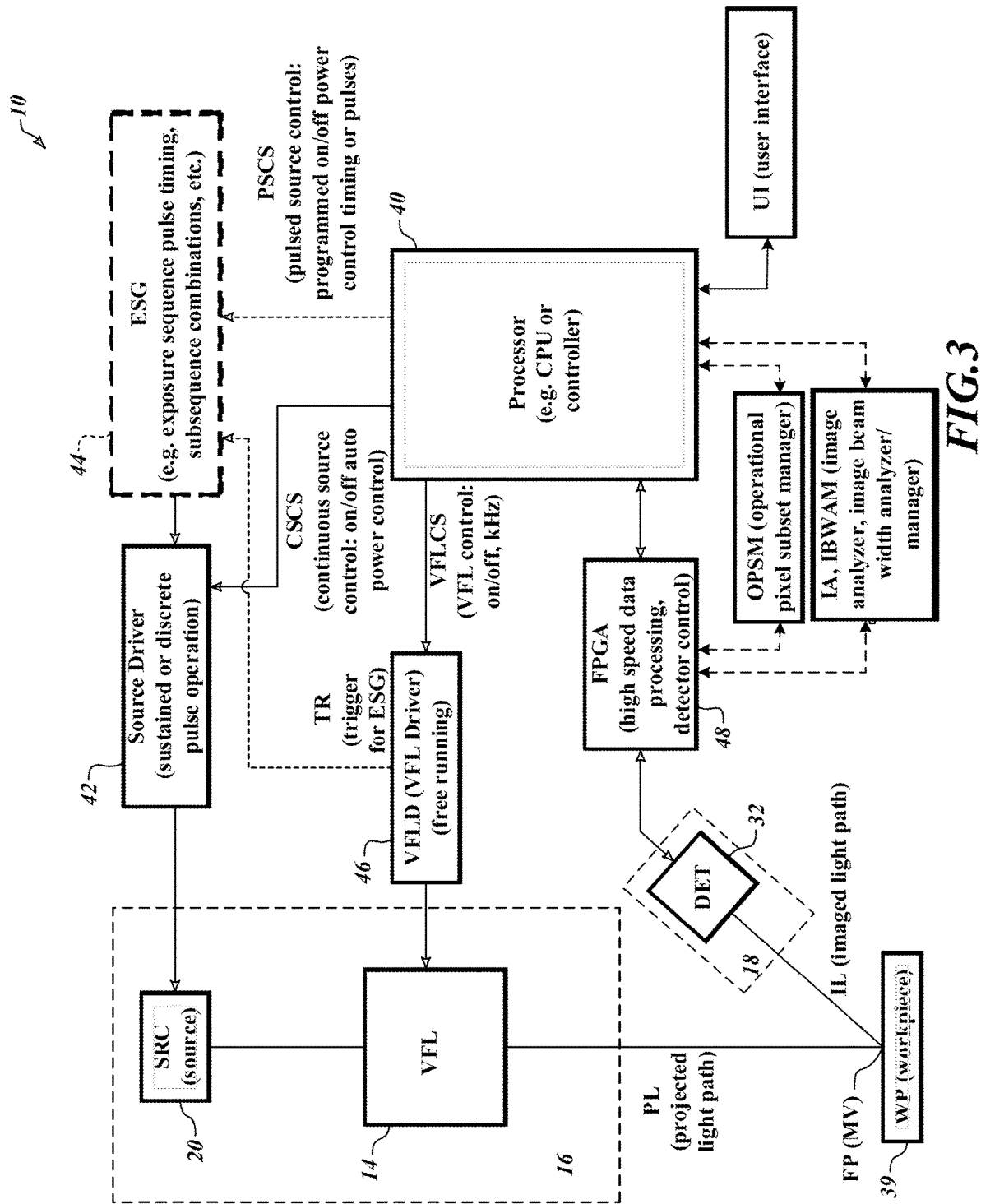
FIG. 3 is a block diagram of various components forming a triangulation sensing system according to one embodiment, similar to the one shown in FIG. 1.

FIG. 3 is a block diagram of various components of a triangulation sensing system 10 according to one embodiment, similar to the triangulation sensing system 10 shown in FIG. 1. In FIG. 3, the triangulation sensing system 10 includes the projection axis configuration 16 including the light source SRC 20 and the VFL 14 (e.g., a TAG lens), and the imaging axis configuration 18 including the triangulation image detector DET 32. A workpiece 39 having a workpiece surface is placed in the triangulation sensing system 10 such that a respective location on the workpiece surface in the measurement volume MV can be measured, using the triangulation light scanned over the focus position scanning range FPSR in the measurement volume MV.

The triangulation sensing system 10 includes a processor 40 configured to control operation of the projection axis configuration 16 and the imaging axis configuration 18. The processor 40 may be a controller/central processing unit (CPU) of any computing system or device, including personal computers, server computers, minicomputers, mainframe computers, distributed computing environments that include any of the foregoing, and the like. In the implementation shown in FIG. 3, the processor 40 includes, or is coupled to, a source driver 42, an exposure sequence generator ESG 44, a VFL driver 46, and a field-programmable gate array FPGA 48.

The source driver 42 is configured to control operation of the light source SRC 20 to expose a triangulation image of the workpiece surface by using a sustained exposure increment based on sustained illumination (e.g. a continuous exposure), using a set of discrete exposure increments (based on pulsed illumination), or using a combination thereof. To achieve continuous illumination, the processor 40 may send continuous source control signals CSCS to the source driver 42 and may further perform on/off control and auto power control of the light source SRC 20 via the source driver 42. The exposure sequence generator ESG 44 is configured to generate an exposure sequence comprising one or more sets of discrete exposure increments at one or more triangulation light focus positions FP, during one or more cycles of the periodically modulated triangulation light focus position (e.g. at various respective phase timings of the source driver signal during the one or more cycles). It may also be configured to an exposure sequence comprising sustained exposure increments that are not continuous. Various alternative exposure sequences are described in greater detail below. The exposure sequence generator ESG 44 may generate an exposure sequence based on pulsed source control signals PSRC received from the processor 40. For example, the pulsed source control signals PSRC may be customized to define auto power control of the light source SRC 20 (e.g. for particular workpiece surface regions of interest WSROI on a workpiece to be measured or inspected) based on an exposure sequence generation routine and/or a workpiece inspection part program generator included in the processor 40 or otherwise connected to the triangulation sensing system 10. The source driver 42 receives the generated exposure sequence from the exposure sequence generator ESG 44 and controls operation of the light source SRC 20 according to the received exposure sequence, to achieve a set of exposure increments (based on pulsed illumination) for exposing a respective triangulation image of the workpiece surface. In some implementations, the exposure sequence generator ESG 44 and the source driver 42 may be merged and/or indistinguishable.

In the particular implementation shown in FIG. 3, the VFL driver 46 is configured to be responsive to a trigger signal TR included in VFL control signals VFLCS sent from the processor 40 to start and stop a (free running) operation of the VFL 14, such that the VFL 14 periodically modulates the triangulation light focus position FP over a focus position scan range along the projection optical axis direction in the triangulation light extended focus range TLEFR 12. It should be appreciated that the timing of signals in the VFL driver 46 is synchronized with the timing of signals in the ESG 44 and/or the source driver 42, as will be understood by one of ordinary skill in the art based on this disclosure and its incorporated references.

The FPGA 48 is configured to control operation of the triangulation image detector DET 32 and to perform high speed data processing of triangulation images obtained by the triangulation image detector DET 32.

In the implementation shown in FIG. 3, the triangulation sensing system 10 further includes a user interface UI, an operational pixel subset manager OPSM, and an image analyzer IA, which may include or be connected to an image beam width analyzer/manager IBWAM. These elements are described in greater detail below with reference to FIGS. 7 and 8. They may be considered optional elements of the triangulation sensing system 10 in some implementations. In some implementations, these elements may be integrated into the processor 40 and/or the FPGA 48, or connected thereto, as illustrated. Briefly, the operational pixel subset manager OPSM comprises a circuit or routine which is configured to limit the acquisition, readout or analysis associated with a triangulation image to an operational set of pixels of the detector 32, which includes pixels that image a particular workpiece surface region of interest and excludes other pixels, in order to increase the measurement throughput capability of the triangulation sensing system 10. The image analyzer IA comprises a circuit or routine which is configured to identify and measure workpiece surface regions in a triangulation image. The image beam width analyzer/manager IBWAM comprises a circuit or routine which is configured to analyze actual or desired image characteristics of the triangulation light from various workpiece surface regions and determine its beam width and/or intensity profile, which is related to the potential measurement accuracy that can be achieved based on that beam width and/or intensity profile. All of these elements are useful aids in configuring the triangulation sensing system 10 to achieve a desired level of throughput and/or accuracy in various applications, as described in greater detail with reference to FIGS. 7 and 8.

While the source driver 42, the exposure sequence generator ESG 44, the VFL driver 46, the FPGA 48, the user interface UI, the operational pixel subset manager OPSM, the image analyzer IA, and the image beam width analyzer/manager IBWAM are illustrated as discrete components separate from the processor 40, those skilled in the art will understand that such is merely one implementation example, and these components or their sub-components or their functionalities may be integrated into the processor 40 and/or the FPGA 48, or may be differently distributed from that shown in FIG. 3, or even further or fewer components and functionalities may be included in the triangulation sensing system 10 depending on each application. The processor 40 and these components 42, 44, 46, and 48 may comprise one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such devices. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

In various exemplary implementations, the processor 40 (42, 44, 46, 48, OPSM, IA, IBWAM) is configured to control the VFL 14 to periodically modulate the triangulation light focus position FP over a focus position scan range FPSR along the projection axis direction, to provide a triangulation light extended focus range (TLEFR) corresponding to the FPSR, wherein the TLEFR is greater than M times a nominal unmodulated focus range (NUFR) of the projection axis configuration along the Z axis, where M is an integer that is at least 2, 25, 50 or 100 or more. The processor 40 (42, 44, 46, 48, OPSM, IA, IBWAM) is further configured to expose a triangulation image of the workpiece surface using a triangulation image exposure sequence ES, wherein during the exposure sequence ES the periodic modulation of the triangulation light focus position FP causes the triangulation light focus position FP to temporarily coincide with a Z height ZROI of at least one workpiece surface region of interest WSROI to be measured in the triangulation image. The triangulation image exposure sequence ES may comprise at least one of exposure types 1) or 2) or 3). Exposure types 1), 2), and 3) are described in detail with reference to FIGS. 4A-5D.

In certain implementations, various components of the triangulation sensing system 10 shown in FIG. 3 may be configured to implement other operations as follows: In various embodiments, the processor 40 (42, 44, 46, 48) may be further configured to process the triangulation image, obtained pursuant to the triangulation image exposure sequence of exposure type 1) or 2) or 3) described above, to determine or output at least one respective Z height corresponding to at least one respective location on the workpiece surface that is included in the triangulation image. For example, the processor 40 (42, 44, 46, 48) may be configured to determine or output a coordinate map comprising a set of respective Z heights corresponding to respective locations on the workpiece surface that are included in the triangulation image. The determined Z height or a coordinate map comprising a set of respective Z heights may be output, numerically and/or visually, on the user interface (e.g. on a display device) coupled to the processor 40 (42, 44, 46, 48). In some implementations, an entire triangulation image exposure sequence of exposure type 2) or 3) as disclosed herein, may be compiled in the processor 40 and/or the exposure sequence generator ESG 44, and the triangulation sensing system 10 is configured to determine or output a coordinate map comprising a set of respective Z heights corresponding to respective locations on the workpiece surface that are included in the triangulation image based on a single start signal that initiates the predetermined sequence defined in the triangulation image exposure sequence. For example, the processor 40 (42, 44, 46, 48) may execute the entire predetermined sequence to determine or output a coordinate map of a set of Z heights, responsive to the signal start signal which is triggered, for example, by a user operation on a user interface device (not shown) coupled to the processor 40 (42, 44, 46, 48). To this end, the processor 40 including, or coupled to, the FPGA 48 may be configured to process the triangulation image, to determine or output a coordinate map comprising a set of respective Z heights corresponding to respective X locations on the workpiece surface that are included in the triangulation image. Thus, a coordinate map including Z heights of respective X locations on the workpiece surface may be obtained with respect to a certain Y location. In further embodiments, the processor 40 may repeat the process of determining or outputting such coordinate map for a plurality of Y locations on the workpiece surface along the Y axis, to thereby determine or output a set of coordinate maps that respectively indicate Z heights of respective X locations corresponding to respective Y locations on the workpiece surface.

Figure 4A:
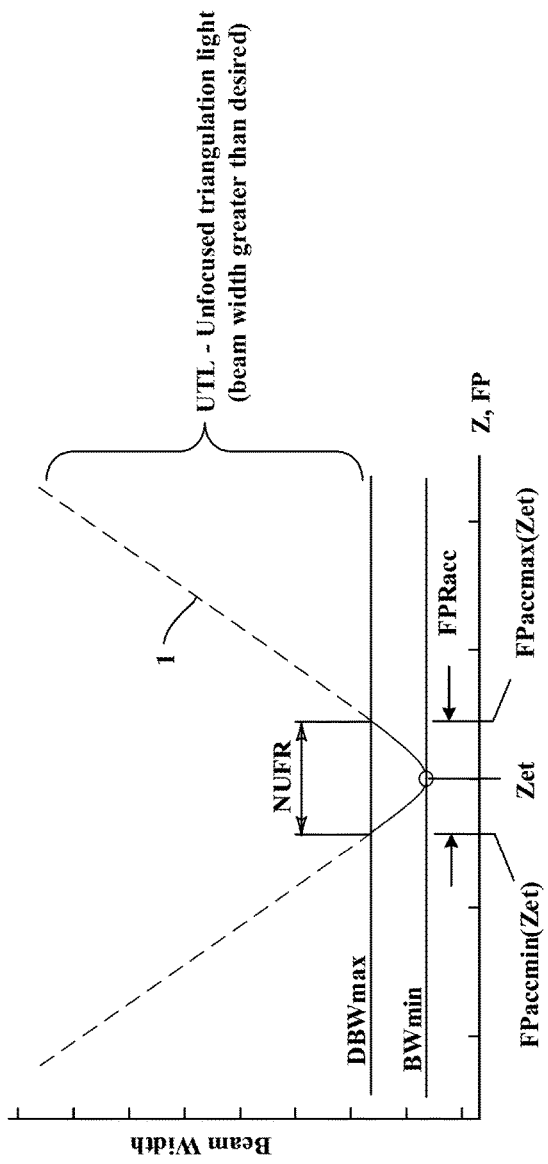
FIGS. 4A and 4B are graphs illustrating a nominal unmodulated focus range NUFR in relation to features of a triangulation light extended focus range (TLEFR) achieved with a triangulation sensing system according to principles disclosed herein.
Figure 4B:
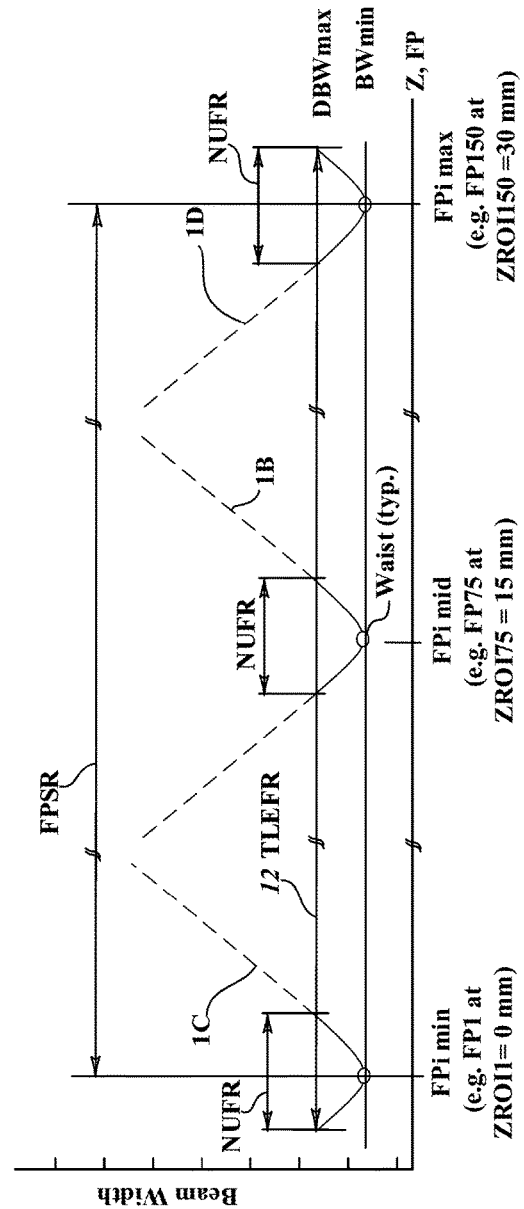

FIGS. 4A and 4B are graphs illustrating a nominal unmodulated focus range NUFR in relation to features of a triangulation light extended focus range TLEFR, achieved with a triangulation sensing system according to principles disclosed herein.

In FIG. 4A, curve 1 indicates a beam width ("Beam Width") as a function of distance along the Z axis (e.g. see the half width HW in the YZ view in FIG. 1) for triangulation light focused (e.g. temporarily focused) at a single focus position FP, which for the sake of description is an exposure target (et) Z coordinate Zet. A circle located on curve 1 indicates the focus position FP which coincides with a minimum Beam Width BWmin achievable with the previously outlined projection axis configuration 16. This position may also be referred to as the (temporary) best focus position. The range of Z positions FPRacc indicates a range of focus positions FP which are close enough to the best focus position so that the beam width within this range is small enough (within a desired level of focus) and does not exceed a maximum desirable beam width DBWmax, which insures that such beam widths can support a desired or best level of measurement accuracy in a triangulation image. Since this range corresponds to a desirable or best level of focus to be used for exposure in a triangulation image, as shown in FIG. 4A, it may also be referred to as a nominal unmodulated focus range NUFR (shown in FIG. 1), which could be used to provide a desirable triangulation image of a workpiece surface region of interest located at Zet, if the focus position FP were fixed (unmodulated) at Zet. As shown in FIG. 4A, an alternative way of looking at this is to consider that, as long as a focus position FP scan remains between the positions FPacc min and FPaccmax in the focus position range FPRacc (which are nominally separated by the nominal unmodulated focus range NUFR), the beam width on a workpiece surface at the exposure target Z position Zet will remain below the desired beam width limit DBWmax at the exposure target Z position Zet.

As previously outlined, according to one useful description, the nominal unmodulated focus range NUFR may be approximated by the depth of focus of the projection axis configuration 16, which is exhibited when the VFL 14 is in a fixed focus state or turned off. According to another useful description, in some implementations the nominal unmodulated focus range NUFR may be defined in terms of the half width HW of the projected triangulation light across its narrow (Y) direction that is expected or known to provide desirable or best measurement accuracy results in a triangulation image. It will be understood that it may be advantageous in various applications to define or set an upper limit for the beam width and/or half width HW that predominates (or is used exclusively) in an image exposure related to a particular workpiece surface region of interest WSROI having a corresponding Z height ZROI, in order to better define the location of the projected triangulation light line in that image exposure and thereby limit the system measurement uncertainty. It will be understood that such a desirable upper limit for the half width HW of the projected triangulation light along the Y direction may be determined by analysis or experiment. According to this description, the desired or acceptable limit for the half width HW along the Y direction may define the dimension of the desired or acceptable nominal unmodulated focus range NUFR along the Z direction, in some implementations. As shown in FIGS. 4A and 4B, it will be appreciated that because it is focused, the half width HW (beam width) of the projected triangulation light diverges to exceed the desired limit for the half width HW outside of the nominal unmodulated focus range NUFR, which includes "unfocused" triangulation light UTL as indicated in FIG. 4A. It should be appreciated that the designation "unfocused" is relative to the better focused light within the nominal unmodulated focus range NUFR and is somewhat arbitrary, in that the limits of the nominal unmodulated focus range NUFR may be designed or selected differently according to need in various designs or applications, and various levels of "unfocused" triangulation light may still provide usable measurement results in various triangulation images or applications. Despite this caveat, however, better accuracy measurements will generally result when a workpiece surface region of interest WSROI is predominantly or exclusively exposed when the focus position FP of the triangulation light is within the range NUFR (or FPRacc) of the Z position ZROI of that workpiece's surface region of interest WSROI. FIG. 4B shows how this improvement can be achieved over the triangulation light extended focus range TLEFR according to the principles disclosed herein.

In particular, FIG. 4B shows three exemplary temporary focus positions, FPi min, FPi mid, and FPi max, which may be considered representative of a continuous range of focus positions FP over the focus position scan range FPSR due to the previously outlined periodic modulation of the triangulation light focus position FP by the VFL 14. At each of the representative temporary focus positions, a temporary beam width curve 1C, 1B and 1D is shown, analogous to the previously described beam width curve 1 in FIG. 4A, and FIG. 4B may generally be understood based on that previous description. As shown in FIG. 4B, due to the periodic modulation of the location of the focus position FP over the focus position scan range FPSR and the extended focus range TLEFR 12 by the VFL 14, for any particular workpiece surface region of interest WSROIi (e.g. i=1, 75, 150) having a corresponding Z height ZROIi (e.g. ZROI1, ZROI75, ZORI150) anywhere within the extended focus range TLEFR 12, its image may be predominantly or exclusively exposed when the focus position FPi (e.g. FP1, FP75, FP150) of the triangulation light temporarily has a Z height within the range NUFR proximate corresponding to the Z height ZROIi. According to principles outlined above and explained further below, this example will allow a workpiece surface region of interest WSROIi to be measured with the best possible accuracy in a triangulation image, anywhere throughout the extended focus range TLEFR 12 in a triangulation sensing system according to this disclosure.

FIGS. 5 and 5A-5D illustrate the characteristics of three respective types of triangulation image exposure sequences (referred to as exposure types, for short) usable in conjunction with the triangulation light extended focus range TLEFR in a triangulation sensing system according to principles disclosed herein, including a sustained exposure type (type 1), a discrete (e.g., pulsed) exposure type (type 2), and Z-height specific discrete exposure type (type 3). According to a convention used herein, each exposure sequence type is described as comprising a corresponding TYPE of exposure subsequence, and may comprise only that TYPE of exposure subsequence in some instances, or in other instances may comprise that TYPE of exposure subsequence combined with one or more additional exposure subsequences of that TYPE or another TYPE, or both.

As shown in the table in FIG. 5, exposure type 1 comprises at least one TYPE 1 exposure subsequence. The TYPE 1 exposure subsequence is used during at least one cycle of the periodically modulated triangulation light focus position. In some implementations, the timing and signals associated with the TYPE 1 exposure subsequence may be duplicated or repeated (e.g. continued) to a second cycle, a third cycle, and so forth, of the periodically modulated triangulation light focus position. The TYPE 1 exposure subsequence comprises at least one sustained exposure increment that is sustained or continuous over a respective exposure increment triangulation light focus position range eiFPR that exceeds at least one of 5 NUFR or 10% of the TLEFR. An exposure increment focus position range eiFPR that is this large implies that a workpiece surface region of interest WSROI will be partially exposed in the triangulation image while the beam width is in the "unfocused triangulation light" region shown in FIG. 4A. While not conducive to achieving the best measurement accuracy, the TYPE 1 exposure subsequence is conducive to providing usable Z location line segment images in a triangulation image (e.g. one or more line images that exhibit intensity gradients that have readily identifiable Z' peak locations) for surfaces that vary over a relatively large Z height range on the workpiece, because the best-focus beam width scans through and dominates the exposure at each Z height in the exposure increment focus position range eiFPR. Thus, the TYPE 1 exposure subsequence is useful for providing good measurement throughput and relatively good measurement accuracy (compared to a prior art "non-scanned" triangulation system) throughout an extended measuring range in TLEFR. Non-limiting examples of exposure type 1 and/or a TYPE 1 exposure subsequence are shown in FIGS. 5A and 5B, described in greater detail below.

Figure 5C:
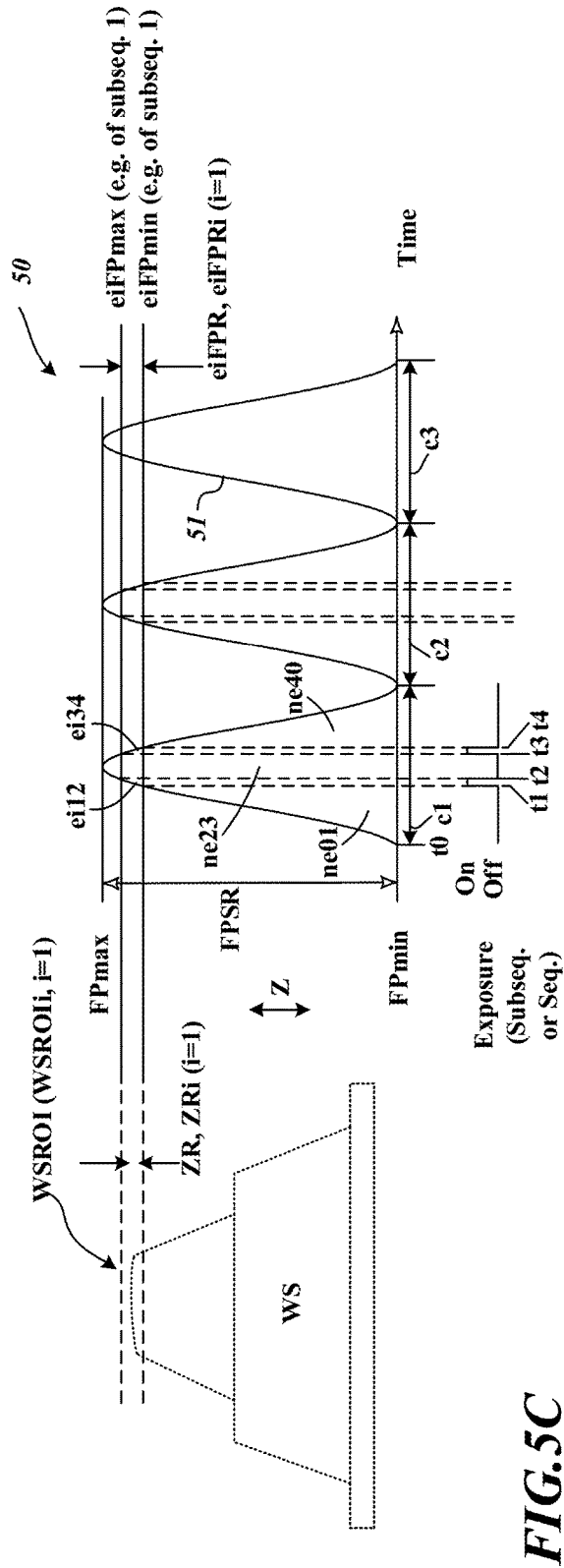
Figure 5D:
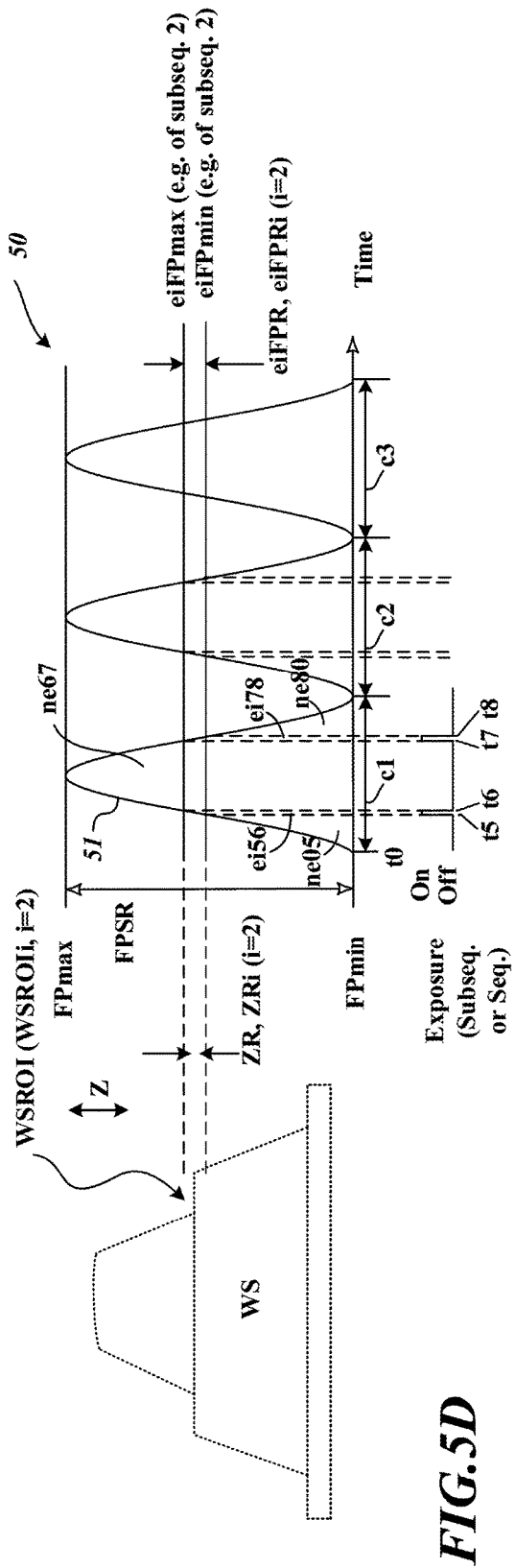

As shown in the table in FIG. 5, exposure type 2 comprises at least one TYPE 2 exposure subsequence. The TYPE 2 exposure subsequence is used during at least one cycle of the periodically modulated triangulation light focus position. In some implementations, the timing and signals associated with the TYPE 2 exposure subsequence may be duplicated or repeated (e.g. continued) to a second cycle, a third cycle, and so forth, of the periodically modulated triangulation light focus position. The TYPE 2 exposure subsequence comprises a set of at least one discrete exposure increment, wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range. An exposure increment focus position range eiFPR at the upper end of these limits implies that a workpiece surface region of interest WSROI will include an exposure contribution in a triangulation image while the beam width is in the more narrow beam width part of the "unfocused triangulation light" region UTL shown in FIG. 4A, but it will not be exposed in the wider beam width part of the region of UTL. While not always configured to provide the absolute best measurement accuracy, the TYPE 2 exposure sequence can generally provide better measurement accuracy than the TYPE 1 "sustained" exposure subsequence over a more limited Z range (which may reduce the measurement throughput). Importantly, the smaller the exposure increment focus position range eiFPR is, the better the measurement accuracy can become at each workpiece surface Z height in the exposure increment focus position range eiFPR. Thus, the TYPE 2 exposure subsequence may be configured to provide "better" or even "best" measurement accuracy for Z heights in the limited range associated with a small exposure increment focus position range eiFPR (e.g. 3NUFR, or 1NUFR, etc.) Importantly, the discrete exposure increment focus position range eiFPR can be located at any Z position within the triangulation light extended focus range TLEFR, to accurately measure a workpiece surface region of interest at that Z position. Non-limiting examples of exposure type 2 and/or a TYPE 2 exposure subsequence are shown in FIGS. 5C and 5D, described in greater detail below.

As shown in the table in FIG. 5, exposure type 3 comprises at least one TYPE 3 exposure subsequence. The TYPE 3 exposure subsequence is used during at least one cycle of the periodically modulated triangulation light focus position. In some implementations, the timing and signals associated with the TYPE 3 exposure subsequence may be duplicated or repeated (e.g. continued) to a second cycle, a third cycle, and so forth, of the periodically modulated triangulation light focus position. The TYPE 3 exposure subsequence comprises a set of at least one discrete exposure increment, wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range. It may be recognized that the TYPE 3 exposure subsequence is substantially similar to the TYPE 2 exposure subsequence and generally exhibits similar features and benefits as outlined above. However, the TYPE 3 exposure subsequence may be thought of as a "targeted" version of the TYPE 2 exposure subsequence, wherein the exposure increment triangulation light focus position range eiFPR is further timed to correspond specifically to a predetermined nominal Z height or Z height range of a specific workpiece surface region of interest WSROI to be measured in the triangulation image. In practice, when a specific workpiece surface region of interest WSROIi having a known Z height ZRi is to be measured, it is often desired to achieve "best" measurement accuracy. In such a case, the TYPE 3 exposure subsequence may be configured to provide "better" or "best" measurement accuracy by using a relatively smaller (e.g. minimal) exposure increment focus position range eiFPRi (e.g. 3NUFR, or 1NUFR, etc.) that includes ZRi. Importantly, the discrete exposure increment focus position range eiFPRi can be located at any Z position ZRi within the triangulation light extended focus range TLEFR, to accurately measure a workpiece surface region of interest at that ZRi position. Non-limiting examples of exposure type 3 and/or a TYPE 3 exposure subsequence are shown in FIGS. 5C and 5D, described in greater detail below.

FIGS. 5A and 5B illustrate non-limiting examples of the exposure type 1 and/or a TYPE 1 exposure subsequence, to further clarify and explain the principles previously outlined with reference to FIG. 5, by way of graphical examples. FIG. 5A includes curve 51, which illustrates how a Z focal height of the triangulation light focus position FP is modulated over time during, for example, three cycles of the periodic modulation of the VFL. In FIG. 5A the sustained exposure increment of the TYPE 1 exposure subsequence is shown to be a continuous exposure increment, wherein the triangulation light focus position range eiFPR extends over the entire focus position scan range FPSR. As previously outlined, this implies that a workpiece surface region of interest WSROI (e.g. any Z height on the workpiece WS, in this particular example) will be partially exposed in a triangulation image while the beam width is in the "unfocused triangulation light" region shown in FIG. 4A. However, although that is not conducive to the best measurement accuracy, it is conducive to providing usable Z location line segment images in a triangulation image (e.g. line images that exhibit an intensity gradient that has a readily identifiable Z' peak location) for surfaces that vary over the entire Z height range on the workpiece WS, because the best focus beam width scans through, and dominates the exposure at, each Z height in the exposure increment focus position range eiFPR. Thus, this particular TYPE 1 exposure subsequence may be useful for providing good measurement throughput for the workpiece WS and relatively good (or at least useful) measurement accuracy (compared to a prior art "non-scanned" triangulation system) throughout the entire extended measuring range in TLEFR, in a single triangulation image.

FIG. 5B again includes the curve 51, which illustrates how a Z focal height of the triangulation light focus position FP is modulated over three cycles of the periodic modulation of the VFL. FIG. 5B also includes a representation of the timing or control "On/Off" signals (e.g. the signals PSCS provided by the processor 40 and/or the exposure sequence generator ESG to control the source driver 42 in FIG. 3) that govern and correspond to the exposure increments of the TYPE 1 exposure subsequence in FIG. 5B. In particular, in the first cycle of curve 51, the first sustained exposure increment ei12 begins at the time t1 when the light source or camera shutter is activated by the "On" signal level, and ends at the time t2 when the light source or camera shutter is deactivated by the "Off" signal level. In this particular example, later during the first cycle the second sustained exposure increment ei34 begins at the time t3 when activated by the "On" signal level, and ends at the time t4 when deactivated by the "Off" signal level. Between the exposure increments ei12 and ei34 in the first cycle, the "Off" signal level persists between times t2 and t3 leading to a "non-exposure" portion ne23 of the cycle. It may be seen that in this particular example, both of the sustained exposure increments ei12 and ei34 have a duration and timing corresponding to the same exposure increment focus position range eiFPR, which includes the entire Z height range of the workpiece surface region of interest WSROI, which corresponds to approximately the lower half of the workpiece surface WS in this particular example. It will be appreciated that relative to that shown in FIG. 5A, the TYPE 1 exposure subsequence shown in FIG. 5B can provide relatively improved accuracy for measuring the lower half of the workpiece surface WS, because in contrast to FIG. 5A the lower half is not exposed when the focus position FP is at the top of the workpiece surface WS, and the beam width is therefore very large at the lower half. Conversely, the top of the workpiece surface WS is exposed only by very large beam widths corresponding to light focused in the exposure increment focus position range eiFPR at the lower half of the workpiece surface WS, which may lead to poor measurement accuracy at the top of the workpiece surface WS in that triangulation image. This is a good accuracy tradeoff, because the workpiece surface region of interest WSROI at the lower half is defined to be "of interest" in this example, whereas the top of the workpiece surface is not.

It may be noted that FIG. 5B includes "supplementary" reference numbers according to a convention used for some descriptions herein, wherein a specific index "i" may be added to indicate specific respective workpiece surface regions of interest (e.g. WSROIi), Z coordinate ranges (e.g. ZRi), and exposure increment focus position ranges (e.g. eiFPRi) that correspond to one another and/or that are parameters or characteristics that are all associated with a single respective triangulation image.

FIGS. 5C and 5D illustrate non-limiting examples of the exposure type 2 and/or a TYPE 2 exposure subsequence, according to principles previously outlined with reference to FIG. 5.

FIG. 5C again includes the curve 51, which illustrates how a Z focal height of the triangulation light focus position FP is modulated over three cycles of the periodic modulation of the VFL. FIG. 5C also includes a representation of the timing or control "On/Off" signals that govern and correspond to the exposure increments of the TYPE 2 exposure subsequence in FIG. 5C. In particular, in the first cycle of curve 51, the first discrete exposure increment ei12 begins at the time t1 when the light source or camera shutter is activated by the "On" signal level, and ends at the time t2 when the light source or camera shutter is deactivated by the "Off" signal level. In this particular example, later during the first cycle the second discrete exposure increment ei34 begins at the time t3 when activated by the "On" signal level, and ends at the time t4 when deactivated by the "Off" signal level. Between the exposure increments ei12 and ei34 in the first cycle, the "Off" signal level persists between times t2 and t3 leading to a "non-exposure" portion ne23 of the cycle. Additional non-exposure portions ne01 and ne40 of the first cycle are also shown in in FIG. 5C, as will be understood by analogy with previous description. The exposure increments ei12 and ei34 in the first cycle may be described as comprising a set of at least one discrete exposure increment (in this case first and second discrete exposure increments), wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range. In this particular example the exposure increment focus position range eiFPR (eiFPRi) includes the Z height range ZR (ZRi) of the workpiece surface region of interest WSROI (WSROIi), which is the top "step" on the workpiece surface WS. It will be appreciated that relative to TYPE 1 exposure subsequences (including a sustained exposure increment) shown in FIG. 5A or 5B, the TYPE 2 exposure subsequence shown in FIG. 5C can provide relatively improved accuracy for measuring the workpiece surface region of interest WSROI (WSROIi), which is the top "step" on the workpiece surface WS, because it is only exposed when the focus position FP is proximate to its Z height ZRi, and its triangulation image therefore includes exposure contributions arising only from light having a relatively narrow beam width proximate to the workpiece surface region of interest WSROI (WSROIi). Among other benefits, this may be technically advantageous by minimizing multiple reflections that might otherwise arise from light reflected from outside workpiece surface region of interest WSROI (WSROIi), which should be regarded as false signals that could influence the triangulation image contrast adversely.

FIG. 5D again includes the curve 51, which illustrates how a Z focal height of the triangulation light focus position FP is modulated over three cycles of the periodic modulation of the VFL. FIG. 5D also includes a representation of the timing or control "On/Off" signals that govern and correspond to the exposure increments of the TYPE 2 exposure subsequence in FIG. 5D. In particular, in the first cycle of curve 51, the first discrete exposure increment ei56 begins at the time t5 when the light source or camera shutter is activated by the "On" signal level and ends at the time t6 when the light source or camera shutter is deactivated by the "Off" signal level. In this particular example, later during the first cycle the second discrete exposure increment ei78 begins at the time t7 when activated by the "On" signal level and ends at the time t8 when deactivated by the "Off" signal level. Between the exposure increments ei56 and ei78 in the first cycle, the "Off" signal level persists between times t6 and t7 leading to a "non-exposure" portion ne67 of the cycle. Additional non-exposure portions ne05 and ne80 of the first cycle are also shown in FIG. 5D, as will be understood by analogy with previous description. The exposure increments ei56 and ei78 in the first cycle may be described as comprising a set of at least one discrete exposure increment (in this case first and second discrete exposure increments), wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range. In this particular example the exposure increment focus position range eiFPR (eiFPRi) includes the Z height range ZR (ZRi) of the workpiece surface region of interest WSROI (WSROIi), which is the middle "step" on the workpiece surface WS. It will be appreciated that relative to TYPE 1 exposure subsequences (including a sustained exposure increment) shown in FIG. 5A or 5B, the TYPE 2 exposure subsequence shown in FIG. 5D can provide relatively improved accuracy for measuring the workpiece surface region of interest WSROI (WSROIi), which is the middle "step" on the workpiece surface WS, because it is only exposed when the focus position FP is proximate to its Z height ZRi, and its triangulation image therefore includes exposure contributions arising only from light having a relatively narrow beam width.

The exposure increments and timing notations in FIGS. 5C and 5D have been labeled in a way that emphasizes that the figures may be regarded as representing first and second TYPE 2 exposure subsequences which provide respective sets of discrete exposure increments, and they may be used in combination during a single cycle in some implementations of a type 2 exposure sequence, and/or repeated and/or continued in combination in additional cycles in that type 2 exposure sequence, if desired. This implies that the workpiece surface region of interest WSROI1 will be partially exposed by a relatively large beam width while the focus position is in the exposure increment focus position range eiFPR2, and conversely that the workpiece surface region of interest WSROI2 will be partially exposed by a relatively large beam width while the focus position is in the exposure increment focus position range eiFPR1. However, because the regions of interest WSROI1 and WSROI2 and the exposure increment focus position ranges eiFPR1 and eiFPR2 are relatively widely separated, such "crossover" wide beam exposure light has a low intensity, such that the image of each respective region of interest WSROI1 and WSROI2 will be dominated by the narrow beam exposure associated with their respective exposure increment focus position ranges eiFPR1 and eiFPR2. In such a case, they may still be measured with relatively good accuracy in a "combined exposure" triangulation image.

As previously noted with reference to FIG. 5, FIGS. 5C and 5D also illustrate non-limiting examples of the exposure type 3 and/or a TYPE 3 exposure subsequence. As previously noted, the TYPE 3 exposure subsequence is substantially similar to the TYPE 2 exposure subsequence and generally exhibits similar features and benefits as outlined above. Therefore, the previous description of FIGS. 5C and 5D will be understood to apply when considering them as examples of an exposure type 3 and/or a TYPE 3 exposure subsequence, along with the following additional description. As previously indicated, the TYPE 3 exposure subsequence may be thought of as a "targeted" version of the TYPE 2 exposure subsequence, wherein an exposure increment triangulation light focus position range eiFPRi is further timed to correspond specifically to a predetermined nominal Z height or Z height range ZRi of a specific workpiece surface region of interest WSROIi to be measured in the triangulation image. In practice, when a specific workpiece surface region of interest WSROIi having a known Z height ZRi is to be measured, it is often desired to achieve the "best" measurement accuracy. In such a case, the TYPE 3 exposure subsequence may be configured to provide "better" or "best" measurement accuracy by using a relatively smaller (e.g. minimal) exposure increment focus position range eiFPRi (e.g. 3NUFR, or 1NUFR, etc.) that includes ZRi. According to this description, in operation one would first determine the desired workpiece surface region of interest WSROI1 (in FIG. 5C) or WSROI2 (in FIG. 5D), then determine the proper associated Z range ZR1 (in FIG. 5C) or ZR2 (in FIG. 5D), and then determine the corresponding exposure increment focus position range eiFPR1 (in FIG. 5C) or eiFPR2 (in FIG. 5D). Having foreknowledge of the target Z range ZRi (e.g. ZR1 or ZR2) makes it easy to select the timing and duration of the exposure increment focus position range eiFPRi (e.g. eiFPR1 or eiFPR2) to provide the highest throughput in combination with the best accuracy for the associated triangulation. Other aspects of operation which may be associated with a type 3 exposure sequence and/or a TYPE 3 exposure subsequence in some implementations are described further below with reference to FIGS. 7 and 8.

Figure 6:
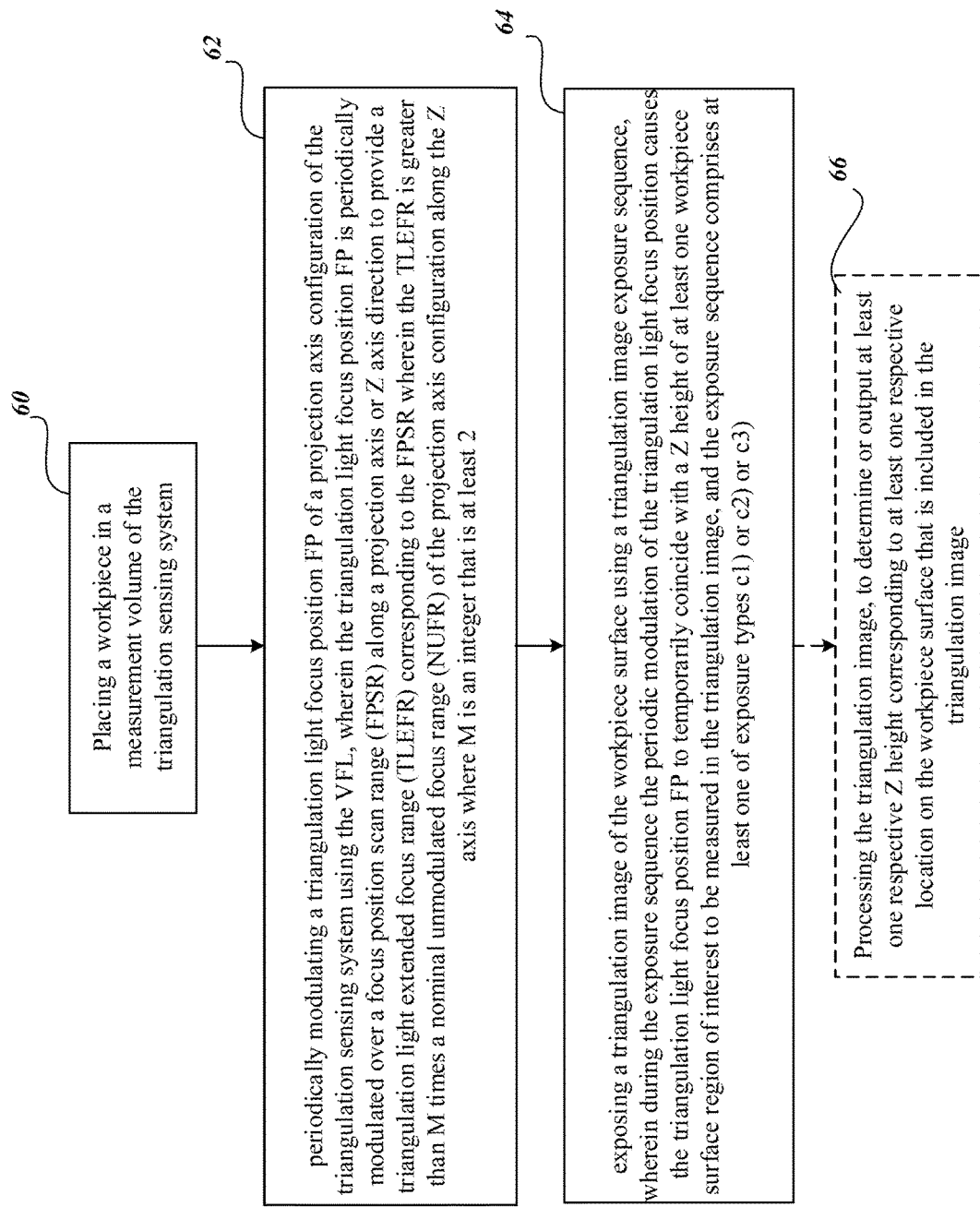
FIG. 6 is a flow diagram showing one example of a method for operating a triangulation sensing system including a variable focus lens (VFL) that provides a periodically modulated focus variation for its triangulation light according to principles disclosed herein.

FIG. 6 is a flow diagram showing one example of a method for operating a triangulation sensing system 10 including a variable focus lens (VFL) 14 that provides a periodically modulated focus variation for its triangulation light according to principles disclosed herein. In step 60, the method places a workpiece 39 in a measurement volume MV of the triangulation sensing system 10. In step 62, the method periodically modulates a triangulation light focus position FP of a projection axis configuration 16 of the triangulation sensing system 10 using the VFL 14, wherein the triangulation light focus position FP is periodically modulated over a focus position scan range FPSR along a projection axis direction or Z axis direction to provide a triangulation light extended focus range (TLEFR) 12. The triangulation light extended focus range TLEFR 12 corresponds to the FPSR. The TLEFR is greater than M times a nominal unmodulated focus range (NUFR) of the projection axis configuration 16 along the Z axis, where M is an integer that is at least 2 (e.g. in various implementations M may be at least 10, 25, 50 or 100, or more.) In step 64, the method exposes a triangulation image of a workpiece surface WS (of the workpiece 39) using a triangulation image exposure sequence, wherein during the exposure sequence the periodic modulation of the triangulation light focus position causes the triangulation light focus position FP to temporarily coincide with a Z height of at least one workpiece surface region of interest WSROI to be measured in the triangulation image (e.g. using one the exposure sequence of type 1, type 2 or type 3 as disclosed herein.) In step 66, optionally, the method processes the triangulation image, to determine or output at least one respective Z height corresponding to at least one respective location on the workpiece surface WS that is included in the triangulation image.

Figure 7:
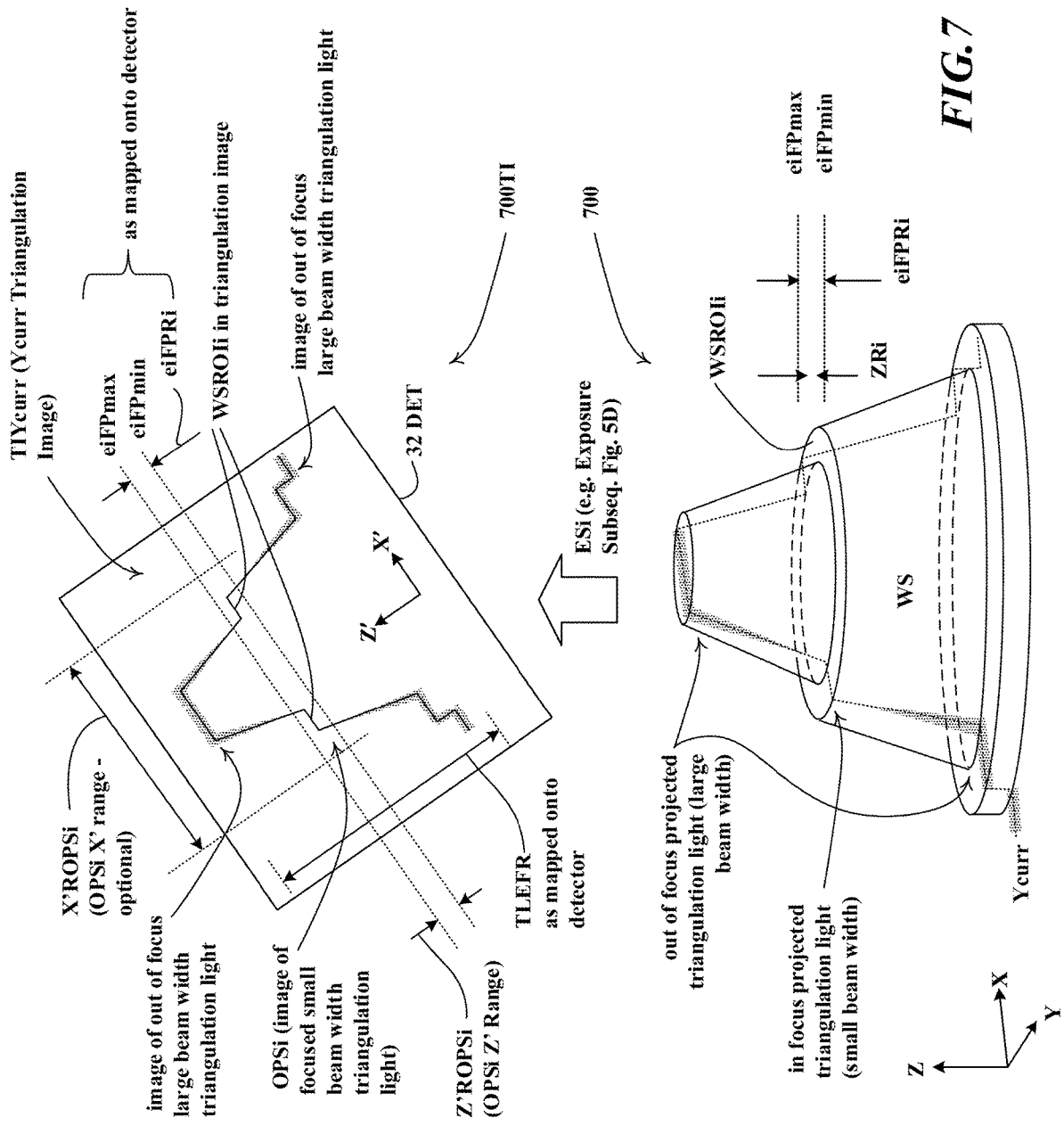
FIG. 7 is a diagram illustrating a workpiece illuminated using a line of triangulation light at a time during a discrete type exposure, a corresponding triangulation image, and certain features related to using an operational pixel set of the triangulation image to increase the throughput and/or accuracy of a triangulation sensing system according to principles disclosed herein.

FIG. 7 is a diagram 700 illustrating a workpiece WS illuminated using a line of triangulation light at a time during an exposure sequence ESi (e.g. a type 3 exposure sequence including the TYPE 3 exposure subsequence shown in FIG. 5D), along with a corresponding triangulation image representation 700TI, which show certain features related to using an operational pixel subset OPSi of the triangulation image to increase the throughput and/or accuracy of a triangulation sensing system 10 according to principles disclosed herein. It will be understood that the diagram 700 is analogous to FIG. 5D, in that the workpiece surface region of interest WSROIi, its Z range ZRi, and the exposure increment focus position range eiFPRi are all identical to those in FIG. 5D wherein i=2, corresponding to the middle step on the workpiece surface WS. Similarly labeled features in FIG. 7 and FIG. 5D are analogous or identical and may be understood based on previous description. In contrast to the 2D view shown in FIG. 5D, the diagram 700 is a 3D view which also represents qualitatively how the beam width of the triangulation light projects onto different Z heights along the workpiece surface when it is positioned to intersect the workpiece at a "current" Y axis coordinate Ycurr. Ycurr is the Y position used to acquire the triangulation image that is designated TIYcurr in the triangulation image representation 700TI. For purposes of this explanation, which is primarily related to describing the characteristics and use of the operational pixel subset OPSi, it may be assumed that the triangulation image TIYcurr is exposed using a TYPE 3 exposure subsequence. That is, as previously outlined, in operation one would first determine the desired workpiece surface region of interest WSROIi (e.g. the middle step on the workpiece surface WS) and then determine the proper associated Z range ZRi (e.g. based on CAD data or a low accuracy preliminary measurement of the middle step, of the like), and then determine the corresponding exposure increment focus position range eiFPRi to be used in the TYPE 3 exposure subsequence for acquiring the triangulation image TIYcurr. Having foreknowledge of the target Z range ZRi makes it easy to select the timing and duration of the exposure increment focus position range eiFPRi. Furthermore, since it is known by design and/or experiment how Z and X positions in the measurement volume MV map to Z' and X' positions on the triangulation image detector DET (32) in the triangulation sensing system 10, it is also easy to identify where the exposure increment focus position range eiFPRi maps onto the image detector DET, as shown in the diagram 700TI. The location of this mapping is closely related to or used in determining the relevant operational pixel subset OPSi for the triangulation image TIYcurr, as described below.

Briefly, the reason for determining an operational pixels subset OPSi is to reduce the measurement cycle time associated with performing all the operations necessary to measure a corresponding workpiece surface region of interest WSROIi, and thereby increase the measurement throughput of the triangulation system 10. To explain in greater detail, in the example illustrated in FIG. 7 it will be appreciated that the purpose is to measure the workpiece surface region of interest WSROIi (that is, the middle step). Furthermore, as outlined above, it is known what exposure increment focus position range eiFPRi corresponds to its Z height range ZRi within a reasonable tolerance, and what location it will map to in the triangulation image TIYcurr. It will be appreciated that pixels that are proximate to this mapped location are useful for measuring the workpiece surface region of interest WSROIi and are therefore useful as an operation pixel subset OPSi for measuring the workpiece surface region of interest WSROIi. Conversely, pixels that are not proximate to this mapped location are not useful for measuring the workpiece surface region of interest WSROIi, and may therefore be excluded from the operation pixel subset OPSi (e.g. in order to reduce the time spent on related measurement operations.) A desirable operational pixel set may be determined and used as follows:

The operational pixel subset OPSi is determined such that it includes at least pixels in a Z' range Z'ROPSi on the detector that includes at least one of the respective exposure increment focus position range eiFPRi or the respective Z height range ZRi as mapped onto the detector DET (e.g. as shown in the diagram 700TI). Furthermore, the operational pixel subset OPSi excludes at least some pixels that correspond to Z positions that are farther than as least one of 5 NUFR or 10% of TLEFR from the respective exposure increment focus position range eiFPRi, as mapped onto the detector DET.

As will be understood based on previous description, measuring the workpiece surface region of interest WSROIi in a respective triangulation image requires performing operations comprising: (a) acquiring the respective triangulation image using a corresponding respective exposure sequence ESi (which utilizes the respective exposure increment focus position range eiFPRi), (b) reading out pixel data of the acquired respective triangulation image from the detector DET to a triangulation image analyzing circuit or routine, and (c) operating the triangulation image analyzing circuit or routine to measure the respective workpiece surface region of interest WSROIi in the respective triangulation image based on the pixel data.

In order to provide the desirable measurement throughput benefits outlined above, in various implementations according to the principles disclosed herein, at least one of the operations (a), (b) or (c) is limited to pixels or pixel data corresponding to the operational pixel subset OPSi.

In some implementations, the extent of the workpiece surface region of interest WSROIi along the X axis is known (e.g. based on CAD data or a low accuracy preliminary measurement of the middle step, of the like) as well as what range X'R it will map to in the triangulation image TIYcurr. Therefore, in some implementations, the operational pixel subset OPSi is further constrained according to an OPSi X'range X'ROPSi, which includes only pixels in the mapped range X'R of the extent of the workpiece surface region of interest WSROIi along the X axis, and may include an additional desired tolerance zone of pixels proximate thereto, approximately as shown in the diagram 700TI. However, this additional constraint is optional in various implementations of the operational pixel subset OPSi.

It should be appreciated that although the foregoing description of one exemplary implementation of an operational pixel subset OPSi was in relation to a TYPE 3 exposure subsequence and its associated discrete exposure increment, there is nothing in the foregoing description that limits the implementation of an operational pixel subset OPSi to discrete exposure increments. To the contrary, an operational pixel subset OPSi may be implemented according to the general principles outlined above in connection with an extended workpiece surface region of interest (e.g. such as that shown in FIG. 5B), which has a workpiece surface Z height range ZRi that requires a sustained exposure increment in order for the exposure increment focus position range eiFPRi to span the Z height range ZRi.

Figure 8:
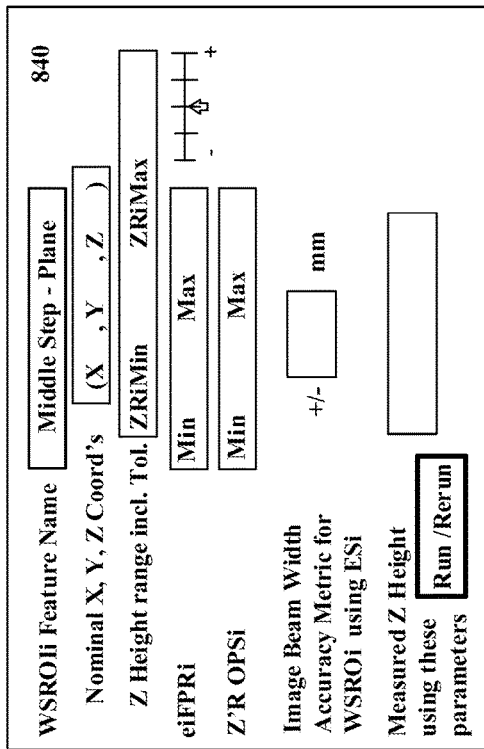
FIG. 8 is a diagram illustrating certain features usable in a user interface that facilitate the use of an operational pixel set to increase the throughput and/or accuracy of a triangulation sensing system according to principles disclosed herein.
Figure 8:
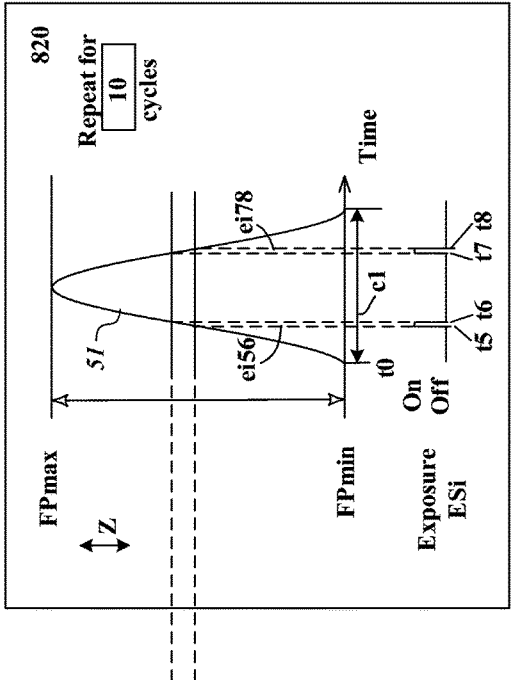
Figure 8:
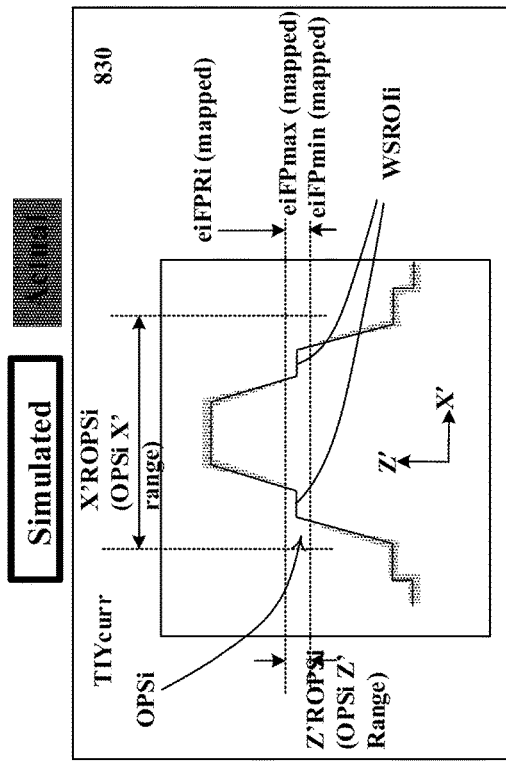
Figure 8:
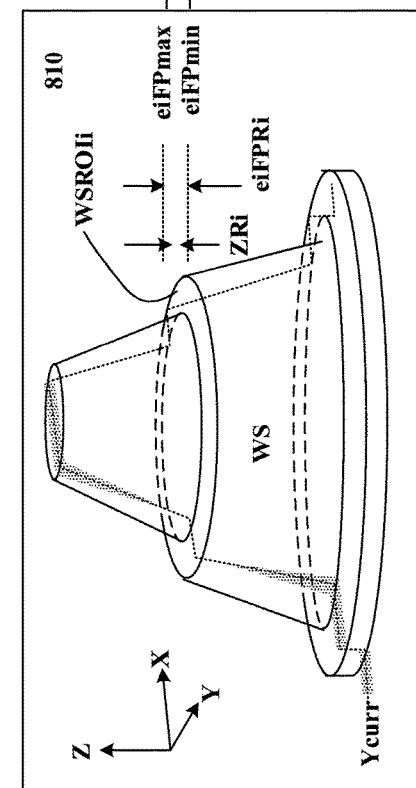

FIG. 8 is a diagram illustrating certain features usable in a user interface UI that facilitates the use of an operational pixel set OPSi to increase the throughput and/or accuracy of a triangulation sensing system 10 according to principles disclosed herein. It will be understood that the user interface UI may generally include other useful features not shown in FIG. 8, according to known principles. The user interface may be connected to or part of a triangulation sensing system 10 to exchange data and control signals, as previously outlined with reference to FIG. 3. The features of the UI shown in FIG. 8 include a 3D view and simulation window 810, an exposure sequence view window 820, a triangulation image actual or simulated window 830, and a region of interest parameter summary window 840.

In some embodiments, the UI may operate as follows.

A user may enter a workpiece name in the associated entry box shown in the UI. If the workpiece name corresponds to the name of a CAD file that is connected to the system, it may be automatically rendered and displayed in the 3D view and simulation window 810, along with various labels, display features, and the like, according to known methods (e.g. as known for commercially available coordinate measurement machine or machine vision systems for example.) It may then be desirable to determine a respective workpiece surface region of interest WSROIi to be measured in a respective triangulation image using a respective triangulation image exposure sequence ESi, and determine a respective Z range ZRi that includes the respective WSROIi to be measured. In one implementation or instance, a workpiece inspection program generator that is connected to or part of the triangulation sensing system may automatically define the workpiece surface region of interest WSROIi based on the CAD model of the workpiece surface and automatically determine the applicable respective Z range ZRi that includes the respective WSROIi (e.g. as is known for commercially available coordinate measurement machines that include automatic program generation). In other implementations or instances, a user may select the respective workpiece surface region of interest WSROIi in the 3D view and simulation window 810, and the associated applicable respective Z range ZRi may be automatically determined based on its associated CAD data. Alternatively, the user can define and enter data as needed to characterize the respective workpiece surface region of interest WSROIi and the associated applicable respective Z range ZRi by any other known method. In any of the foregoing implementations, the determined respective workpiece surface region of interest WSROIi may be displayed in the context of the workpiece surface in a graphical user interface (e.g. the window 810) that is connected to or part of the triangulation sensing system.

Next, a respective triangulation image exposure sequence ESi may be determined, including determining a respective exposure increment focus position range eiFPRi that is used during at least one exposure increment in the respective exposure sequence ESi, wherein the respective exposure increment focus position range eiFPRi includes the respective Z range ZRi, and is timed to include a time when the triangulation light focus position FP coincides with the Z range ZRi. In the UI shown in FIG. 8, a respective triangulation image exposure sequence ESi and a respective exposure increment focus position range eiFPRi according to this description are shown in the exposure sequence view window 820, which includes features analogous to those shown in FIG. 5D and may generally be understood based on that previous description. In the UI embodiment shown in FIG. 8, certain features of the exposure sequence ESi (e.g. eiFPR and its limits) may be aligned with and extended into the window 310, where the respective workpiece surface region of interest WSROIi is displayed, so that a user may readily recognize whether the exposure sequence ESi has been determined appropriately in relation to WSROIi and/or adjust its configuration as needed. For example, the user may use a cursor to select and drag any of the timings (e.g. t5, t6, etc.) and/or the Z limits eiFPRmin or eiFPRmax of the exposure increment focus position range eiFPR, in order to edit the exposure sequence ESi. The user may also enter the number of repeated cycles to be included in the exposure sequence ESi in the entry box in the window 820. It will be appreciated that in some embodiments, the results of such editing may be immediately reflected in related elements in all the windows shown in the UI in FIG. 8 using known techniques. In some embodiments, the editing may be performed on any of those related elements. In one implementation or instance, an ESi generating routine or program that is connected to or part of the triangulation sensing system may automatically define a respective exposure increment focus position range eiFPRi used in the respective exposure sequence ESi based used on the respective Z range ZRi that was determined as outlined above, in combination with data characterizing the periodic modulation of the focus position FP in the triangulation sensing system (e.g. as represented in the focus position curve 51). In some such implementations, the ESi generating routine or program is configured to automatically define the respective exposure increment focus position range eiFPRi to be less than a predetermined limit that is less than at least one of 5 NUFR or 10% of the TLEFR, if the workpiece surface region of interest WSROIi corresponds to a planar surface feature that is characterized by a single Z height in a CAD model of the workpiece surface.

In other implementations or instances, a user may select or define the respective exposure increment focus position range eiFPRi, using known graphical user interface operations in the 3D view and simulation window 810 or the exposure sequence view window 820 (e.g. drawing, and/or drag and drop operations.) Alternatively, the user can define and enter data as needed to characterize the respective exposure sequence ESi by any other known method. In any of the foregoing implementations, a determined respective exposure increment focus position range eiFPRi that is included in the respective exposure sequence ESi may be displayed in a graphical user interface (e.g. the window 820) that is connected to or part of the triangulation sensing system.

In some implementations, determining the respective triangulation image exposure sequence ESi may be an iterative process, comprising: Determining the respective triangulation image exposure sequence ESi initially; Next, generating a simulated or actual triangulation image of the respective workpiece surface region of interest WSROIi, using the initially determined image exposure sequence ESi; Next, analyzing an image beam width corresponding to the respective workpiece surface region of interest WSROIi in the simulated or actual triangulation image, and determining if the measurement accuracy associated with that image beam width is acceptable or not; Next, if it is determined that the measurement accuracy associated with that image beam width is not acceptable, then performing operations to reduce the respective exposure increment focus position range eiFPRi that is used in the image exposure sequence ESi, so as to provide an improved respective triangulation image exposure sequence ESi. In the UI shown in FIG. 8, the simulated or actual triangulation image may be displayed or represented in the triangulation image actual or simulated window 830. An actual image may be input from the image detector of the triangulation sensing system according to known methods, and display. A simulated image may be generated based on using a known optical rendering or analysis programs or routines, in combination with known characteristics of the triangulation system and the respective triangulation image exposure sequence ESi. Indicator/Selector boxes or buttons "Simulated" and "Actual" associated with the window 830 may determine or indicate whether a simulated or actual triangulation image is displayed in window 830. Analyzing the image beam width corresponding to the respective workpiece surface region of interest WSROIi in the simulated or actual triangulation image to determine if the measurement accuracy associated with that image beam width is acceptable or not acceptable may be performed automatically in some implementations. For example, by using an image analyzer IA and/or image beam width analyzer/manager IBWAM that is connected to or part of the triangulation sensing system as previously outlined with reference to FIG. 3, the beam width and/or gradients at various X' location in the triangulation image may be determined based on the pixel data in the actual or simulated image, and analyzed in order to determine the expected Z height measurement accuracy at the various X' locations along the beam (e.g. using principles and techniques previously outlined and referenced in the description herein related to FIG. 2). The results (e.g. uncertainty magnitude or accuracy level) may be color coded in the pixels in the beam width in the window 830 and/or displayed in the "Image Beam Width Accuracy Metric" portion of the summary window 840.

Alternatively to automatic analysis, in some implementations or applications it may be sufficient to simply display the imaged beam (beam width) in the window 830, and a user may qualitatively analyze its width to qualitatively determine the expected Z height measurement accuracy at the various X' locations along the beam. Next, regardless of the type of analysis, if it is determined that the measurement accuracy associated with the image beam width is not acceptable for the respective workpiece surface region of interest WSROIi, then operations are performed automatically, or manually by the user, to reduce the respective exposure increment focus position range eiFPRi that is used in the image exposure sequence ESi, to provide an improved respective triangulation image exposure sequence ESi.

After at least one of the respective exposure increment focus position range eiFPRi (as included in the image exposure sequence ESi), or the respective Z range ZRi, have been determined, the respective operational pixel subset OPSi of the detector pixels that is to be used for determining the measurement of the respective workpiece surface region of interest WSROIi (based on the respective triangulation image) may be determined either automatically or manually. For example, an OPSi generating routine or program that is connected to or part of the triangulation sensing system (e.g. as previously outlined for the operation pixel subset manager OPSM in FIG. 3) may be configured to automatically define the respective operational pixel subset OPSi based on at least one of the respective exposure increment focus position range eiFPRi (determined as outlined above) or the respective Z range ZRi (determined as outlined above), in combination with data characterizing a mapping of measurement volume coordinates to image detector coordinates in the triangulation sensing system. Alternatively, a user may select or define or edit the respective operational pixel subset OPSi in the user interface UI by using manual UI techniques in the various windows, similar to techniques previously outlined. In either case, according to this disclosure the operational pixel subset OPSi is configured such that it includes at least pixels in a Z' range Z'ROPSi on the detector that includes at least one of the respective exposure increment focus position range eiFPRi or the respective Z range ZRi as mapped onto the detector. It is furthermore configured such that it excludes at least pixels that correspond to Z positions that are farther than as least one of 5 NUFR or 10% of TLEFR from the respective exposure increment focus position range eiFPRi, as mapped onto the detector. In the UI shown in FIG. 8, the respective operational pixel subset OPSi is shown superimposed on the triangulation image in the window 830, so that a user may readily recognize whether the operational pixel subset OPSi has been determined appropriately in relation to WSROIi, and/or adjust its configuration as needed. For example, the user may use a cursor to select and drag any of the displayed limit lines of the operational pixel subset OPSi (e.g. the lines bounding the its Z' range Z'ROPSi) in the window 830 and/or the Z limits eiFPRmin or eiFPRmax of the exposure increment focus position range eiFPRi in the window 810 or the window 820, in order to edit the operational pixel subset OPSi.

The summary window 840 may be a real-time updated window that provides a compact numerical summary of various parameters related to the operations outlined above. The parameters indicated in the window 840 shown in FIG. 8 will be understood based on previous description, and it will be understood that actual real time values (not shown in FIG. 8) may be displayed in the appropriate locations therein. The "eiFPRi" portion of the window 840 includes a user-adjustable slider that may be used to edit the range of the respective exposure increment focus position range eiFPRi.

After the various operations outlined above have been performed, it is possible to measure the respective surface region of interest WSROIi based on a respective triangulation image, and use the respective operational pixel subset OPSi to perform the associated operations in a shorter time than would be achievable without using the operational pixel subset OPSi. In various implementations according to principles disclosed herein, doing so comprises the following operations: (a) acquiring the respective triangulation image using the respective exposure sequence ESi with a workpiece surface, including the respective workpiece surface region of interest WSROIi located in the measurement volume MV; (b) reading out pixel data of the acquired respective triangulation image from the detector to a triangulation image analyzing circuit or routine; and (c) operating the triangulation image analyzing circuit or routine to measure the respective workpiece surface region of interest WSROIi in the respective triangulation image based on the pixel data, wherein at least one of the operations (a), (b) or (c), is limited to pixels or pixel data corresponding to the operational pixel subset OPSi. In one such implementation, at least the operation (c) is limited to pixels or pixel data corresponding to the operational pixel subset OPSi. In another such implementation, at least the operations (b) and (c) are limited to pixels or pixel data corresponding to the operational pixel subset OPSi. In another such implementation, all of the operations (a), (b) and (c) are limited to pixels or pixel data corresponding to the operational pixel subset OPSi. Commercial image detectors are increasingly available with features that allow subsets of their pixels to be activated or deactivated during their image acquisition and/or readout operations, which facilitates limiting the operations (a) and/or (b) to an operational pixel subset OPSi, as outlined above.

It will be appreciated by one skilled in the art of sensor-based metrology (e.g. using coordinate measurement machines (CMMs) or machine vision inspection systems (MVISs)), that the various operations previously outlined with reference to FIG. 8 may be performed by using the triangulation sensing system during learn mode operations analogous to those used in the aforementioned CMMS or MVISs. Briefly, data determined during the learn mode operations may be stored in a respective workpiece surface inspection program or routine for operating the triangulation sensing system, including data characterizing at least the respective workpiece surface region of interest WSROIi, the respective triangulation image exposure sequence ESi including the respective exposure increment focus position range eiFPRi, and the respective operational pixel subset OPSi, along with other parameters of the triangulation sensing system that are necessary for exposing a triangulation image of the respective workpiece surface region of interest WSROIi using the triangulation image exposure sequence ESi. Subsequently, the operations (a) (b) and (c) outlined immediately above may be performed at a time after the learn mode operations by using the triangulation sensing system to execute that respective workpiece surface inspection program or routine, including limiting at least one of the operations (a) (b) and (c) to pixels or pixel data corresponding to the operational pixel subset OPSi.

Various features and implementation techniques useable in conjunction with various user interface features and/or operations and/or modes of operation outlined above may be found in commercially available coordinate measuring machines or vision machines, and/or program generating software associated with such machines, as well as in U.S. Pat. Nos. 9,646,425, 9,013,574, 8,957,960, 9,952,586, 9,740,190, each of which are hereby incorporated herein by reference in their entirety.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A method for operating a triangulation sensing system including a variable focus lens (VFL) that provides a periodically modulated focus variation of its triangulation light, the method comprising:
  (a) placing a workpiece surface in a measurement volume of the triangulation sensing system;
  (b) periodically modulating a triangulation light focus position FP of a projection axis configuration of the triangulation sensing system using the VFL, wherein the triangulation light focus position FP is periodically modulated over a focus position scan range (FPSR) along a projection axis or Z axis direction, to provide a triangulation light extended focus range (TLEFR) corresponding to the FPSR, wherein the TLEFR is greater than M times a nominal unmodulated focus range (NUFR) of the projection axis configuration along the Z axis where M is an integer that is at least 2; and
  (c) exposing a triangulation image of the workpiece surface using a triangulation image exposure sequence, wherein during the exposure sequence the periodic modulation of the triangulation light focus position causes the triangulation light focus position FP to temporarily coincide with a Z height of at least one workpiece surface region of interest to be measured in the triangulation image, and the exposure sequence comprises at least one of exposure types c1) or c2) or c3), wherein:
    exposure type c1) comprises exposing the triangulation image using at least a first TYPE 1 exposure subsequence that is used during at least one cycle of the periodically modulated triangulation light focus position, the TYPE 1 exposure subsequence comprising at least one sustained exposure increment that is sustained or continuous over a respective exposure increment triangulation light focus position range eiFPR that exceeds at least one of 5 NUFR or 10% of the TLEFR;
    exposure type c2) comprises exposing the triangulation image using at least a first TYPE 2 exposure subsequence that is used during at least one cycle of the periodically modulated triangulation light focus position, the TYPE 2 exposure subsequence comprising a set of at least one discrete exposure increment, wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range; and
    exposure type c3) comprises exposing the triangulation image using at least a first TYPE 3 exposure subsequence that is used during at least one cycle of the periodically modulated triangulation light focus position, the TYPE 3 exposure comprising a set of at least one discrete exposure increment, wherein each discrete exposure increment in that set has a duration corresponding to an exposure increment triangulation light focus position range eiFPR that is less than at least one of 5 NUFR or 10% of the TLEFR, and is timed to correspond to the same nominal triangulation light focus position or focus position range, and is further timed to correspond to a predetermined nominal Z height or Z height range of a workpiece surface region of interest to be measured in the triangulation image.

2. The method of claim 1, wherein the TLEFR spans a Z dimension of the measurement volume.

3. The method of claim 1, wherein the triangulation sensing system comprises an incoherent light source that provides incoherent triangulation light, and in step (b) the incoherent triangulation light focus position FP is periodically modulated over the focus position scan range (FPSR).

4. The method of claim 3, wherein M is at least 25.

5. The method of claim 1, wherein, in (c), the triangulation image exposure sequence comprises exposure type c1), and the at least one sustained exposure increment is sustained or continuous over a respective exposure increment triangulation light focus position range eiFPR that exceeds at least one of 30 NUFR or 25% of the TLEFR.

6. The method of claim 1, wherein, in (c), the triangulation image exposure sequence comprises exposure type c2) or c3), and each discrete exposure increment in the set of at least one discrete exposure increment has a duration corresponding to a respective exposure increment triangulation light focus position range eiFPR that is less than at least one of 3 NUFR or 5% of the TLEFR.

7. The method of claim 6, wherein each discrete exposure increment in the set of at least one discrete exposure increment has a duration corresponding to a respective exposure increment triangulation light focus position range eiFPR that is less than 2% of the TLEFR.

8. The method of claim 1, wherein, in (c), the triangulation image exposure sequence comprises exposure type c2) or c3), and each of the discrete exposure increments is determined by at least one of:
  a respective instance of an illumination source strobe operation that has a respective controlled timing defined in the triangulation image exposure sequence, or
  a respective instance of a camera shutter operation that has a respective controlled timing defined in the triangulation image exposure sequence.

9. The method of claim 8, further comprising:
(d) processing the triangulation image, to determine or output at least one respective Z height corresponding to at least one respective location on the workpiece surface that is included in the triangulation image.

10. The method of claim 9, wherein the respective controlled timings are defined as a predetermined sequence in the triangulation image exposure sequence, and the triangulation sensing system is configured to determine or output a coordinate map comprising a set of respective Z heights corresponding to respective locations on the workpiece surface that are included in the triangulation image, based on a single start signal that initiates the predetermined sequence defined in the triangulation image exposure sequence.

11. A triangulation sensing system, comprising:
a projection axis configuration having a projection optical axis which intersects with a measurement volume;
an imaging axis configuration having an imaging optical axis which intersects with the measurement volume, wherein the imaging optical axis and the projection optical axis form a triangulation angle; and
a processor configured to control operation of the projection axis configuration and the imaging axis configuration;
wherein,
the projection axis configuration includes:
a light source;
a variable focus lens (VFL) that provides a periodically modulated focus variation; and
triangulation light shaping optics (TLSO) configured to shape light generated from the light source and modulated by the VFL to be output along the projection optical axis or a Z axis toward the measurement volume;
the imaging axis configuration includes:
a triangulation image detector; and
imaging optics configured to transmit triangulation light from a surface of a workpiece located in the measuring volume to the triangulation image detector; and
the processor is configured to:
(a) control the VFL to periodically modulate a focus position of the triangulation light over a focus position scan range (FPSR) along a projection axis direction, to provide a triangulation light extended focus range (TLEFR) corresponding to the FPSR, wherein the TLEFR is greater than M times a nominal unmodulated focus range (NUFR) of the projection axis configuration along the Z axis where M is an integer that is at least 2; and
(b) expose a triangulation image of the workpiece surface using a triangulation image exposure sequence, wherein during the exposure sequence the periodic modulation of the triangulation light focus position causes the triangulation light focus position FP to temporarily coincide with a Z height of at least one workpiece surface region of interest to be measured in the triangulation image.

12. The triangulation sensing system of claim 11, wherein the triangulation image exposure sequence comprises at least one of exposure types b1) or b2) or b3), wherein:
exposure type b1) comprises exposing the triangulation image using at least a first TYPE 1 exposure subsequence that is used during at least one cycle of the periodically modulated triangulation light focus position, the TYPE 1 exposure subsequence comprising at least one sustained exposure increment that is sustained or continuous over a respective exposure increment triangulation light focus position range eiFPR that exceeds at least one of 5 NUFR or 10% of the TLEFR;
exposure type b2) comprises exposing the triangulation image using at least a first TYPE 2 exposure subsequence that is used during at least one cycle of the periodically modulated triangulation light focus position, the TYPE 2 exposure subsequence comprising a set of at least one discrete exposure increment, wherein each discrete exposure increment in that set has a duration corresponding to a respective exposure increment triangulation light focus position range eiFPR that is less than at least one of 5 NUFR or 10% of the TLEFR, and is timed to correspond to the same nominal triangulation light focus position or focus position range; and
exposure type b3) comprises exposing the triangulation image using at least a first TYPE 3 exposure subsequence that is used during at least one cycle of the periodically modulated triangulation light focus position, the TYPE 3 exposure comprising a set of at least one discrete exposure increment, wherein each discrete exposure increment in that set has a duration corresponding to a respective exposure increment triangulation light focus position range eiFPR that is less than at least one of 5 NUFR or 10% of the TLEFR, and is timed to correspond to the same nominal triangulation light focus position or focus position range, and is further timed to correspond to a predetermined nominal Z height or Z height range of a workpiece surface region of interest to be measured in the triangulation image.

13. The triangulation sensing system of claim 12, wherein the exposure type comprises exposure type b2) or b3), and each of the discrete exposure increments is determined by at least one of:
a respective instance of an illumination source strobe operation that has a respective controlled timing defined in the triangulation image exposure sequence, or
a respective instance of a camera shutter operation that has a respective controlled timing defined in the triangulation image exposure sequence.

14. The triangulation sensing system of claim 13, wherein the VFL is a tunable acoustic gradient (TAG) lens, and the periodic modulation comprises a modulation frequency that is greater than 30 kHz.

15. The triangulation sensing system of claim 11, wherein the TLEFR spans a Z dimension of the measurement volume.

16. The triangulation sensing system of claim 11, wherein the light source comprises an incoherent light source, the triangulation light comprises incoherent light, the projection axis configuration is configured to provide the triangulation light as a compact spot of light or a narrow line of light at the focus position, and M is at least 25.

17. The triangulation sensing system of claim 16, wherein the projection axis configuration is configured to provide the triangulation light as a narrow line of light at the focus position, the line of light extending along an X axis direction, and the projection axis configuration comprises a source slit aperture having an axis aligned along the X axis direction and provided between the light source and the VFL in the projection axis configuration.

18. The triangulation sensing system of claim 17, wherein the light source comprises a plurality of light emitters arrayed to correspond to the shape of the source slit aperture, and the projection axis configuration further comprises a linear or uniaxial diffuser between the VFL 14 and the measurement volume MV, which nominally only diffuses along the line of light parallel to the X axis direction.

19. The triangulation sensing system of claim 18, wherein:
- the triangulation image detector comprises a 2D digital imaging device comprising pixels arranged in a plurality of columns that respectively extend along a measuring axis direction (Z') of the 2D digital imaging device, wherein the plurality of columns are adjacent to one another along a direction corresponding to the X direction; and
- the processor is configured to process the triangulation image, to determine or output a coordinate map comprising a set of respective Z heights corresponding to respective X locations on the workpiece surface that are included in the triangulation image.

\* \* \* \* \*